(12) United States Patent
Guillot et al.

(10) Patent No.: US 6,566,420 B1
(45) Date of Patent: *May 20, 2003

(54) EPDM ROCKET MOTOR INSULATION

(75) Inventors: David G. Guillot, Tremonton, UT (US); Albert R. Harvey, Brigham City, UT (US)

(73) Assignee: Alliant Techsystems Inc., Edina, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/481,709

(22) Filed: Jan. 12, 2000

Related U.S. Application Data

(60) Provisional application No. 60/115,855, filed on Jan. 13, 1999, provisional application No. 60/115,856, filed on Jan. 13, 1999, provisional application No. 60/115,859, filed on Jan. 13, 1999, and provisional application No. 60/115,857, filed on Jan. 13, 1999.

(51) Int. Cl.$^7$ .......................... C08L 9/00; C08F 210/16; C08K 3/36; F02G 1/00; B63H 11/00

(52) U.S. Cl. ...................... 523/138; 524/492; 524/526; 525/331.7; 525/332.3; 60/200.1; 60/204

(58) Field of Search ................. 524/492, 526; 525/331.7, 332.3; 523/138; 60/200.1

(56) References Cited

U.S. PATENT DOCUMENTS

| | | | |
|---|---|---|---|
| 3,347,047 A | 10/1967 | Hartz et al. | |
| 3,421,970 A | 1/1969 | Daly et al. | |
| 3,562,304 A | 2/1971 | Tucker | |
| 3,637,576 A | 1/1972 | Sutherland | |
| 4,066,590 A | 1/1978 | Eldred et al. | |
| 4,373,048 A | 2/1983 | Schubert et al. | |
| 4,492,779 A | 1/1985 | Junior et al. | |
| 4,514,541 A | 4/1985 | Frances | |
| 4,550,130 A | 10/1985 | Kishida et al. | |
| 4,878,431 A | 11/1989 | Herring | |
| 4,956,397 A | 9/1990 | Rogowski et al. | |
| 5,212,944 A | 5/1993 | Martin et al. | |
| 5,225,457 A | 7/1993 | Borowczak et al. | |
| 5,352,507 A | 10/1994 | Bresson et al. | |
| 5,364,905 A | 11/1994 | Bauer et al. | |
| 5,498,649 A | 3/1996 | Guillot | |
| 5,569,716 A | 10/1996 | Okamoto et al. | |
| 5,621,045 A | * 4/1997 | Patel et al. | |
| 5,821,284 A | 10/1998 | Graham et al. | |
| 5,830,384 A | 11/1998 | Stephens et al. | |

FOREIGN PATENT DOCUMENTS

EP   0 446 573 A2   9/1991

OTHER PUBLICATIONS

DuPont Dow Elastomers, Introducing Nordel IP. Setting a New Standard in Predictability, "Delivering a New Standard of Performance", (1997), pp. 1–6.
Product Description, Grades of Nordel IP Based on Insite Catalyst and Process Technology, (1997), p. 3.
DuPont Dow Elastomers, Nordel IP NDR–4640, "Nordel IP Grade Comparison", (1997), pp. 1–7.
DuPont Dow Elastomers, Nordel IP NDR–4520, "Nordel IP Grade Comparison", (1997), pp. 1–5.
DuPont Dow Elastomers, "Nordel IP Product Specification Information", pp. 2–3.

* cited by examiner

*Primary Examiner*—Tae H. Yoon
(74) *Attorney, Agent, or Firm*—Sullivan Law Group

(57) ABSTRACT

A novel and improved EPDM formulation for a solid propellant rocket motor is described wherein hexadiene EPDM monomer components are replaced by alkylidene norbornene components and with appropriate adjustment of curing and other additives functionally-required rheological and physical characteristics are achieved with the desired compatibility with any one of a plurality of solid filler materials, e.g. powder silica, carbon fibers or aramid fibers, and with appropriate adhesion and extended storage or shelf life characteristics.

18 Claims, 3 Drawing Sheets

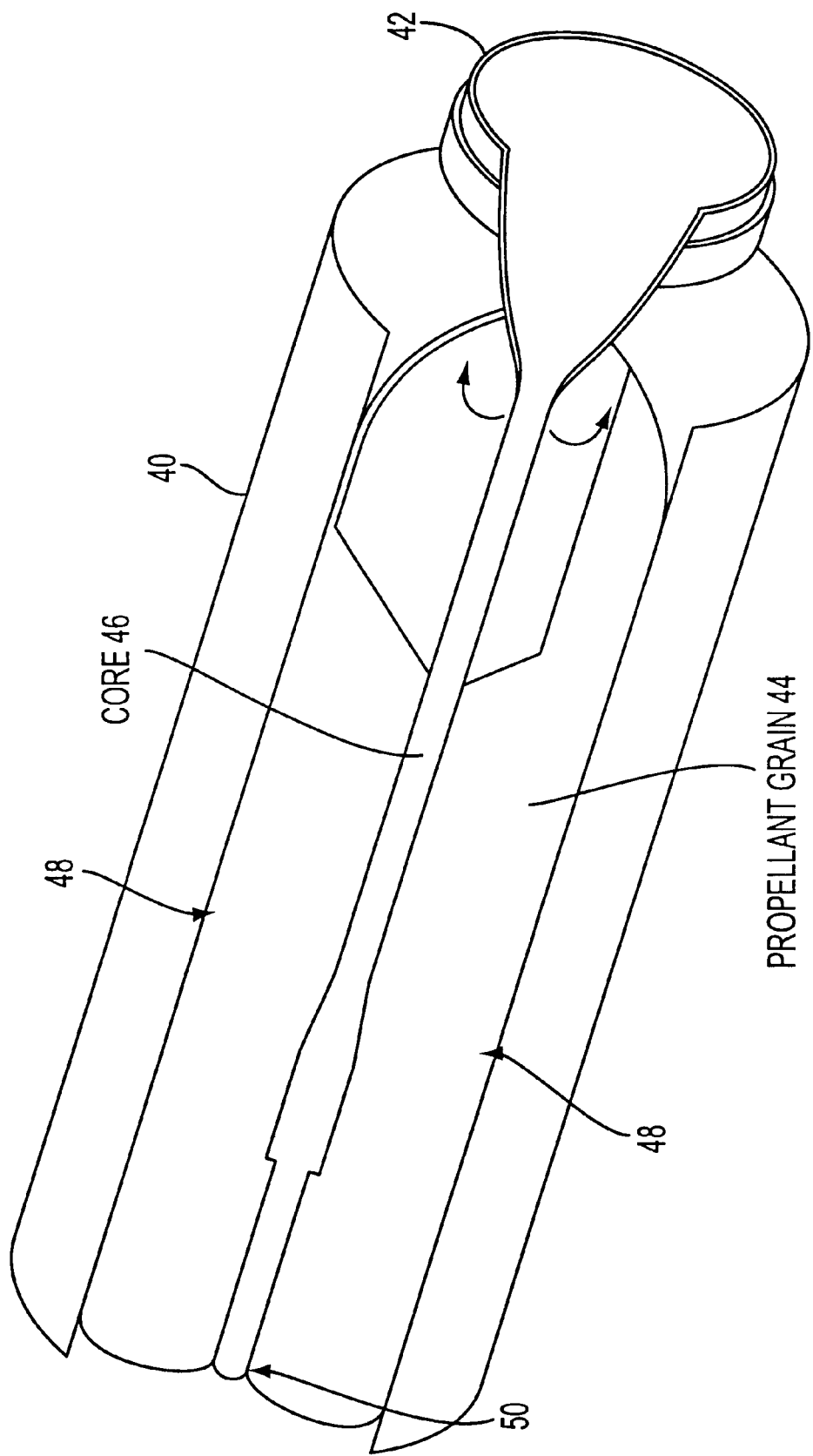

EPDM ROCKET MOTOR INSULATION

This application claims the benefit of the priority from Provisional Application Nos. 60/115,855, 60/115,856, 60/115,859 and 60/115,857 filed on Jan. 13, 1989.

ORIGIN OF THE INVENTION

The U.S. Government has a paid-up license in this invention and the right in limited circumstances to require the patent owner to license others on reasonable terms as provided for by the terms of contract NAS 8-38100 awarded by the National Aeronautics and Space Administration (NASA) and contract N00030-97-C-0100 awarded by the U.S. Department of the Navy.

BACKGROUND OF THE INVENTION

1. Field of the Invention

This invention relates to a novel composition and method for providing insulation for solid propellant rocket motors, and more particularly to EPDM compositions having fibrous components such as carbon fibers or powder fillers such as silica, or also containing Kevlar reinforcing fibers and suitable for internal and external insulation applications on such rocket motors.

2. Background and Description of the Related Art

It is generally accepted current industry practice to prepare insulations for solid propellant rocket motors from a polymeric base importantly composed of an EPDM (ethylene-propylene-diene monomer) terpolymer blend and containing as one of the diene monomer components of the EPDM blend a 1,4-hexadiene (HD).

This EPDM terpolymer, which is commonly designated as the primary EPDM terpolymer since it is present in a higher concentration than the secondary EPDM terpolymer, has been established as a standard for solid propellant rocket motor insulations due to its superior ablation characteristics, excellent physical properties and processability.

For instance, an exemplary carbon fiber-filled rocket motor insulation composed of NORDEL 1040 as the primary terpolymer is commonly known in the industry as the STW4-2868 thermal insulation and has the following composition as shown in Table 1:

TABLE 1

STW4-2868 THERMAL INSULATION FORMULATION
(carbon fiber; parts by weight)

| Ingredient | Function | Parts by Weight |
|---|---|---|
| NORDEL 1040 | Primary EPDM terpolymer base | 80 |
| Neoprene FB | Secondary polymer base | 20 |
| Zinc oxide | Activator | 5 |
| Sulfur | Curative | 1 |
| HAF carbon black | Pigment | 1 |
| MBT | Accelerator | 1 |
| AGERITE Resin D | Antioxidant | 2 |
| AGERITE HPS | Antioxidant | 1 |
| Tellurac | Accelerator | 0.50 |
| Sulfads | Accelerator | 0.75 |
| VCM carbon fibers | Filler | 41 |
| Total Parts by Weight | | 153.25 |

Alternatively, solid rocket motor insulations are also composed of compositions employing finely divided powder silica as a filler, with or without the added presence of a fibrous reinforcing agent.

Exemplary silica-filled rocket motor insulations have also included NORDEL 1040 and NORDEL 2522 as the primary terpolymer in their formulations and the resulting compositions are respectively commonly known in the industry as the 053A and DL1375 thermal insulations. They have the following compositions shown in Table 2:

TABLE 2

THERMAL INSULATION FORMULATION
(silica filled; parts by weight)

| Ingredient | Function | DL1375 (parts by weight) | 053A (parts by weight) |
|---|---|---|---|
| NORDEL 1040 | Primary EPDM terpolymer base | | 80 |
| NORDEL 2522 | Primary EPDM terpolymer base | 80 | |
| Neoprene FB | Secondary polymer base | 20 | 20 |
| Zinc oxide | Activator | 5 | 5 |
| Sulfur | Curative | 1 | 1 |
| AGERITE Resin D | Antioxidant | 2 | 2 |
| AGERITE HPS | Antioxidant | 1 | 1 |
| Captax | Accelerator | 1 | 1 |
| Tellurac | Accelerator | 0.5 | 0.5 |
| Sulfads | Accelerator | 0.75 | 0.75 |
| HiSil 233 | Filler | 35.5 | 35.5 |
| Total Parts by Weight | | 146.75 | 146.75 |

In addition, an EPDM terpolymer comprising the HD monomer is sold under the tradename NORDEL 2722E. An exemplary silica-filled rocket motor insulation comprising NORDEL 2722E as the secondary terpolymer is commonly known in the industry as the DL1552A thermal insulation and has the following composition as shown in Table 3:

TABLE 3

DL1552A THERMAL INSULATION FORMULATION WITH SILICA

| Ingredient | Function | Parts by Weight |
|---|---|---|
| Buna EP T 3950 (Bayer Corp., Fiber, Additives and Rubber Division of Orange, Texas) | Primary EPDM terpolymer base | 75 |
| NORDEL 2722E (DuPont Dow Elastomers) | Secondary EPDM terpolymer base with high ethylene content | 20 |
| WINGTACK 95 (hydrocarbon resin) (Goodyear Tire and Rubber Co., Chemical Division of Beaumont, Texas) | Tackifier | 7 |
| IRGANOX 1010 (tetrakis[methylene-3-(3'-5'-di-tert-butyl-4'-hydroxyphenyl)proprionate]methane) (Ciba Specialty Chemicals, Additives Division, Tarrytown, N.Y.) | Antioxidant | 1 |
| TRYCOL DA-6 (decyl polyoxyethylene alcohol)(Chemical Associates, Inc. of Copley, Ohio) | Wetting agent | 0.5 |
| Stearic acid (including palmitic acid) (Harwick Standard Distribution Corp. of Akron, Ohio) | Cure activator | 1 |
| HiSil 233 (silica hydrate)(PPG Industries, Inc. of Lake Charles, Louisiana) | Reinforcing filler | 45 |
| Aluminum oxide C ($Al_2O_3$)(Degussa Corporation of Ridgefield Park, N.J.) | Reinforcing filler | 0.3 |
| N330 carbon black (Columbian Chemicals Co. of Marietta, Ga.) | Pigment and reinforcing filler | |
| KALENE 1300 (butyl gum elastomer) | Co-vulcanizing | 20 |

TABLE 3-continued

DL1552A THERMAL INSULATION FORMULATION WITH SILICA

| Ingredient | Function | Parts by Weight |
|---|---|---|
| (Hardman Division of Harcros Chemicals, Inc. of Belleville, N.J.) | plasticizer | |
| HYPALON 20 (chlorosulfonated polyethylene)(DuPont Dow Elastomers) | Cure activator | 5 |
| AGERITE Resin D (polymerized trimethyl dihydroquinone)(R.T. Vanderbilt Co., Inc. of Buena Park, Ca.) | Antioxidant | 0.25 |
| TZFD-88p (zinc oxide dispersed in an EPDM binder)(Rhein Chemie Corp. of Trenton, N.J.) | Cure activator | 2 |
| SP 1056 (bromomethyl alkylated phenolic resin)(Schenectady Int'l, Inc. of Schenectady, N.Y.) | Curing agent | 15 |
| Total Parts by Weight | | 193.05 |

An exemplary aramid fiber filled rocket motor insulation comprising NORDEL 1040 is commonly known in the industry as R196 thermal insulation and has the following composition as shown in Table 4:

TABLE 4

R196 THERMAL INSULATION FORMULATION WITH KEVLAR

| Ingredient | Function | Parts by Weight |
|---|---|---|
| NORDEL 1040 (EPDM terpolymer) | Polymer base | 80 |
| NATSYN 2200 (polyisoprene) (Goodyear Tire and Rubber Co., Chemical Division of Akron, Ohio) | Polymer base | 20 |
| WINSTAY S (styrenated phenols) (Goodyear Tire and Rubber Co., Chemical Division of Akron, Ohio) | Antioxidant | 1.0 |
| Dechlorane Plus 515 (1,2,3,4,7,8,9,10,13,13,14,14-dodecachloro-1,4,4a,5,6,6q,7,10,10a,11,12,12a-dodecahydro-1,4,7,10-dimethanodibenzo (a,e) cyclooctene) (Occidental Chemical Corporation of Dallas, Texas) | Flame retardant | 40 |
| Antimony oxide ($Sb_2O_3$)(Harcros Chemicals, Inc. of Kansas City, Kansas) | Flame retardant/filler | 20 |
| ¼" KEVLAR fiber (aramid staple fiber) (E.I. duPont de Nemours and Co., of Wilmington, Delaware) | Fiber | 20 |
| VAROX DBPH-50 (2,5-dimethyl-2,5-di(t-butylperoxy)hexane on a carrier) (R.T. Vanderbilt Co., Inc. of Buena Park, Ca.) | Curing agent | 2.5 |
| Total Parts by Weight | | 183.5 |

Numerous past efforts to develop effective replacements for these standard solid rocket motor insulation formulations have not been successful.

The only manufacturer currently producing the foregoing primary EPDM terpolymer in adequate quantities to meet the demands of the rocket motor insulation industry is DuPont Dow Elastomers of Beaumont, Tex., which markets and sells an EPDM terpolymer comprising the HD monomer under the tradename NORDEL 1040 and Nordel 2522.

However, the ability of the industry to produce STW4-2968, DL1375, 053A, DL1552A, R196 and other thermal insulations containing NORDEL 1040 and NORDEL 2522, and NORDEL 2722E as a primary or secondary EPDM terpolymer has recently been placed in jeopardy due to the announcement by DuPont of its intention to cease production of NORDEL 1040, 2522, 2722E and, generally, other EPDM polymers formed from 1,4-hexadiene. There is therefore a need in this industry, previously not satisfied, to find an effective alternate or a replacement for the above-described standard STW4-2868, DL1375, 053A DL11552A and R196 thermal insulations. Development and formulation of a suitable primary EPDM terpolymer replacement is especially critical for these discontinued NORDEL insulation formulations.

The requirements for an acceptable, functionally effective, insulation for solid propellant rocket motors are well known to be quite severe due to the extreme conditions to which the insulation is exposed. These conditions not only include exceedingly high temperatures but also severe ablative effects from the hot particles (as well as gases) that traverse and exit the rocket motor interior. Unless the insulation will withstand such conditions, catastrophic failure may (and has) occur.

U.S. Pat. No. 3,347,047, an early patent describing asbestos fiber filled insulations, states that flame temperatures encountered in the combustion of propellants, particularly when used as source of propulsion, necessitating the confinement of the gases of combustion and ultimate release thereof through orifices, are usually accompanied by extremely turbulent flow conditions. All of these features place considerable stress and strain upon the member defining the escape passageway. While the combustion of the propellant in the case of rockets and the like will usually be of short duration, the temperatures and turbulence encountered have been found to very easily destroy even the strongest and most exotic alloys formed of iron, steel, titanium, magnesium, silicon, chromium, beryllium and the like. As a consequence, the projectile structure fails leading to total destruction thereof through explosion or in the event that only the exit passageway is destroyed, the projectile proceeds in an erratic uncontrollable path since its trajectory or path is at least in part dependent upon the contour of the passageway through which pass the gaseous products of combustion. That statement still remains fully applicable today.

Therefore any replacement insulation should exhibit at least comparable temperature resistant and ablation characteristics and rheological and physical properties (e.g., Mooney viscosity) at least equivalent to that of STW4-2868, DL1375, 053A, DL1552A and R196, yet should not otherwise significantly alter the formulation techniques employed for the production of the such rocket motor thermal insulation. Additionally, due to the large and growing quantities of solid propellant rocket motor insulation required by the industry, any such replacement EPDM terpolymer candidate should be abundantly available now and into the foreseeable future.

In addition, any replacement EPDM or like terpolymer should satisfy a number of other requirements including wettability of and bond strength with such diverse filler additives as a carbon fiber, aramid fiber, and a silica powder. It is also necessary that such additives be substantially homogeneously dispersed throughout the insulation composition as it is being produced. While standard mixing devices can be employed in the practice of this invention, such as a Banbury mixer, it is a common experience that substantially homogeneous distribution of fibrous additives is not achieved, or achieved only with difficulty, with many elastomeric compositions. Difficulties have been described as in, for instance, during mixing of the components, it can be observed that premature vulcanization may occur as well as other problems that may impede, or entirely frustrate, effective distribution of the various additives which are essential to the ultimate production of the insulation.

Further, once formulated, the elastomeric composition must also possess acceptable shelf life characteristics such that it remains sufficiently pliable, without becoming fully cured, until used in application to the rocket motor casing. This requirement is essential because the production of a given lot of insulation may have to wait in storage for a number of months prior to use. Typically, the insulation may be stored in large rolls in an uncured, or at most a partially cured, state until ready for use. A number of curing agents are well known and are conventionally employed but still must be compatible with the overall EPDM formulation to permit satisfactory shelf life. This in turn requires a balancing of curing agent activity.

In addition, the formulated insulation should be substantially odorless for obvious reasons and this can require special adjustment of the curing agent components.

After application to the interior (or if desired the exterior) of the rocket motor casing, and subsequent curing thereof, an acceptable insulation must also exhibit satisfactory bonding characteristics to a variety of adjacent surfaces. Such surfaces include the internal surface of the rocket motor casing itself and the insulation must also exhibit adequate bonding characteristics between itself and the propellant grain, typically with an intermediate liner surface. In turn, the propellant grain in a solid propellant rocket motor is composed of a variety of materials notably including still another elastomer, various combustible materials, and such additional components as aluminum particles.

A functionally acceptable solid propellant rocket motor insulation must meet those requirements and must also survive aging tests. Such rocket motors may be fully fabricated even many months before actual firing, and for tactical weapons especially sometimes even more than a year or even a plurality of years. For instance, strategic missiles may be stored in silos or submarine launch tubes for decades. Over that period of time, the insulation must continue to remain fully functional without unacceptable migration of its components to or from adjacent interfacial surfaces and adequately retain its elastomeric characteristics to prevent brittleness. This requirement also needs to be satisfied under wide temperature variations. The vibration and physical stress placed on a rocket motor at the time of launch, whether a ground launch or an air firing, is exceedingly high, and brittleness and cracking in the insulation is effectively intolerable, whether from premature or gradual overcure or whatever cause. Even at the end of the burn of the propellant grain within the rocket motor casing the insulation must remain substantially and functionally intact to avoid potentially catastrophic failures of the entire launch vehicle.

In turn, this means that the insulation composition must meet the ablation limits for protection of the casing throughout the propellant burn without adding undue weight to the motor.

A number of past patents have been granted proposing various solutions to the insulation formulation problem. These include U.S. Pat. No. 3,421,970 (generically describing elastomeric formulations with asbestos); U.S. Pat. No. 3,562,304 (generically describing an elastomeric formulation with asbestos fibers); U.S. Pat. No. 3,637,576 (describing an EPDM formulation with a norbornene component with asbestos fibers); U.S. Pat. No. 4,492,779 (generically describing elastomeric formulations with Kevlar fibers); U.S. Pat. No. 4,514,541 (generically a du Pont "master batch" formulation with Kevlar fibers, but not an insulation); U.S. Pat. No. 4,550,130 (generically describing a moldable carboxylic acid modified EPDM to enhance affinity to various fillers); U.S. Pat. No. 4,878,431 (generically describing an elastomeric formulation using the EPDM Nordel 1040, with Kevlar fibers); U.S. Pat. No. 5,364,905 (describing a technique for the in situ polycondensation formation of aramid fibers, but not referring to rocket motor insulations); U.S. Pat. No. 5,498,649 (describing a polyamide/maleic anhydride modified EPDM with Kevlar fibers for a rocket motor insulation); U.S. Pat. No. 5,821,284 (a Kevlar fiber filled insulation containing an EPDM illustrated by Nordel 2522 in combination with ammonium salts); and U.S. Pat. No. 5,830,384 (generically referring to EPDM's with a "dry water" silica additive for cooling purposes). None of these patents address nor effectively solve the problem faced by the present invention. In fact the frequent reference to Nordel 1040 or Nordel 2522 serves to confirm the observation that these particular elastomers are well-nigh the standard in the rocket motor insulation industry.

Accordingly, the search for a functionally satisfactory elastomeric insulation composition requires discovery and implementation of an extraordinarily complex combination of characteristics. The criticality of the material selection is further demonstrated by the severity and magnitude of the risk of failure. Most insulations are of necessity "man-rated" in the sense that a catastrophic failure can result in the loss of human life—whether the rocket motor is used as a booster for launch of the space shuttle or is carried tactically underneath the wing of an attack aircraft. The monetary cost of failure in satellite launches is well-publicized and can run into the hundreds of millions of dollars.

One well known potential point of failure is the appearance of voids or cracks in the insulation which could lead to the penetration of the rocket motor casing itself. The resultant dispersion of hot gases may not only lead to destruction of the motor generally or can at least lead to its being thrown of its intended course or trajectory with several unhappy results. In such events, either the vehicle itself will self-destruct, or will be intentionally destroyed, or the satellite will be launched into a useless orbit.

Therefore, one of the most difficult tasks in the solid propellant rocket motor industry is the development of a suitable, acceptable insulation composition that will meet and pass a large number of test criteria to lead to its acceptability.

Furthermore, any replacement EPDM terpolymers should not be susceptible to obsolescence issues nor discontinuance in future supply thereof.

SUMMARY OF THE INVENTION

It is, therefore, an object of this invention to address a crucial long-standing need in the industry for an acceptable substitute for the STW4-2868, DL1375, 053A, DL1552A and R1961 insulations by providing a reformulated rocket motor thermal insulation notably comprising a suitable primary or secondary terpolymer replacement for the 1,4-hexadiene-based EPDM and one that minimizes the degree of modification to the existing formulation methods and also as to the ultimate functional properties of the STW4-2868, DL1375, DL 1552A, 053A and R196 thermal insulations.

In accordance with the principles of this invention, these and other objects of the invention are attained by the discovery and provision of a rocket motor insulation formulation comprising, as a primary or secondary terpolymeric base, an EPDM terpolymer formed from at least one alkylidene norbornene, especially ethylidene norbornene (ENB) as the diene component.

Exemplary EPDM terpolymers that may be used according to this invention comprise those having an alkylidene diene, particularly an ENB diene, component include KELTAN 4506, KELTAN 1446A, KELTAN 2308, NORDEL IP NDR-4520, and NORDEL IP NDR-4640, each of which may be substituted into the STW4-2868, DL1375, R196 and 053A insulation for the NORDEL 1040 without requiring significant modifications to the standard STW4-2868, DL1375, 053A, DL1552A and R196 thermal insulation formulation methods nor as to the resulting multitude of functionally acceptable properties. Other exemplary terpolymers include high-ethylene-content EPDM terpolymers formed from an ENB diene component are NORDEL IP NDR-3722p and BUNA EP T 2370, which may be substituted into the DL1552A for the NORDEL IP NDR-2722E without requiring significant modifications to the DL1552A formulation. Nordell IP NDR-3725 has also been used but the supplier (du Pont) has indicated that due to low demand it now prefers a different formulation, Nordel IP NDR-3722, with a lower diene content of about 0.5% versus about 2.5% for Nordel IP NDR-3725p.

It has now been found that only a small proportion of ENB diene component is sufficient for incorporation in such elastomers, say from about 2 to about 10 wt. %, preferably from about 2 to about 7 wt. %, and with the balance of the olefin content of the composition composed of ethylene and propylene, with the ethylene forming from about 40 to about 80 wt. %, preferably from about 50 to about 75 wt. %, and with the remainder being propylene. Trace amounts of other dienes may also be present to induce branching in the elastomer. Generally, the only significant modification that is required involves the selection of a less reactive curing agent to offset the higher reactivity (relative to HD) of ethylidene norbornene (ENB). Furthermore, NORDEL IP NDR-3722 and BUNA EP T 2370 are not presently foreseen as being susceptible to obsolescence issues.

Other objects, aspects and advantages of the invention will be apparent to those skilled in the art upon reading the specification and appended claims which, when read in conjunction with the accompanying drawings, explain the principles of this invention.

BRIEF DESCRIPTION OF THE DRAWINGS

The accompanying drawings serve to elucidate the principles of this invention. In such drawings:

FIG. 3 is a cut-away view of a solid propellant rocket motor illustrating the outer case, the internal insulation layer, the propellant grain, and the insulation of the ignitor closure structure.

DETAILED DESCRIPTION OF THE DRAWINGS

Figure 1:
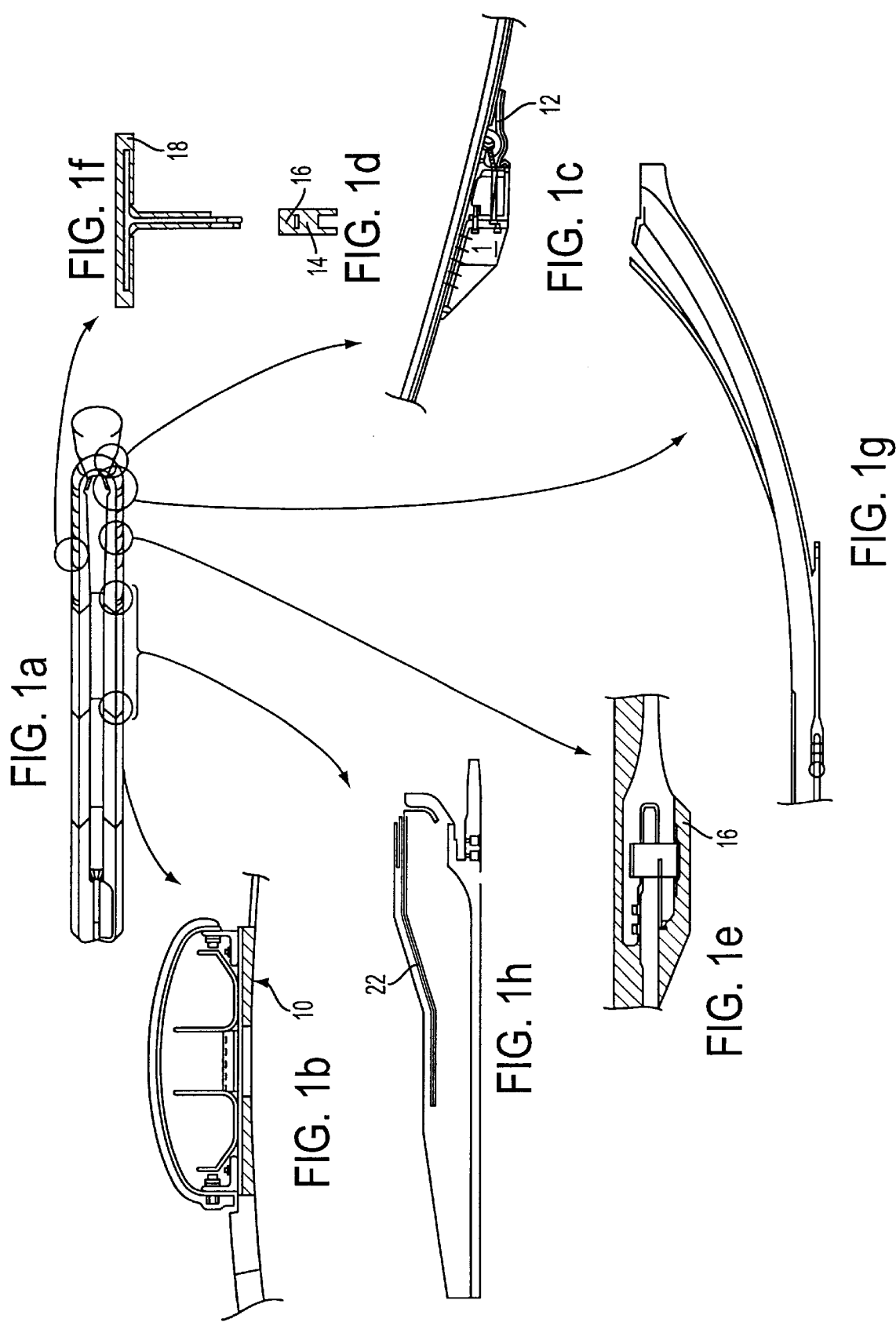
FIG. 1 is a schematic cross-sectional view of a rocket motor depicting various regions in which the insulation of this invention may be applied.

As shown in schematic FIG. 1, and its components in FIGS. 1a–3b, illustrate the manner in which the inventive insulation may be applied to various parts of a rocket assembly. These include, but are not limited to, the system tunnel floor plate shear ply 10, the LSC blast shield 12, the stiffener stub hole plugs 14, stiffener stub insulation 16, the external joint weatherseal 18, T-ring insulation 20, aft dome internal insulation 22, and center segment aft end internal insulation (underneath the flap) 24.

Figure 2:
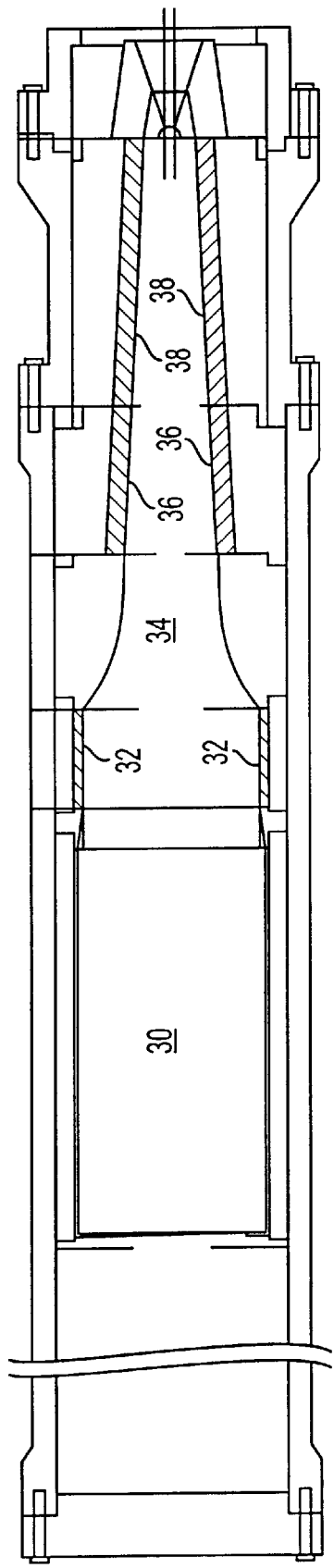
FIG. 2 is a schematic of a char motor suitable for conducting the ablation tests reported herein.

In FIG. 2, the schematic cross-section of a char motor test assembly is illustrated wherein the propellant is contained in the beaker 30, and low velocity insulation test specimens located at 32 upstream of the throat 34, with medium velocity test specimens located in the section at 36 and with high velocity insulation test specimens located in the region 38. Generally, such a char test motor assembly permits the location of a plurality of different insulation formulation test specimens about the circumference at any of locations 32, 36 or 38, in the conventional manner.

FIG. 3 is a cut-away schematic view of a typical rocket motor illustrating the case 40, the nozzle 42, the propellant grain 44 with its center bore 46 and the internal insulation layer shown at 48. The insulation of the ignitor closure structure is indicated at 50.

DETAILED DESCRIPTION OF THE INVENTION

In accordance with one embodiment of this invention, the inventive rocket motor insulation formulation comprises, as a primary polymeric base, an EPDM terpolymer in which the diene component of the EPDM is composed of at least one alkylidene norbornene, and in particular ethylidene norbornene (ENB).

The selected EPDM terpolymer should be substitutable into the STW4-2868, DL1375, 053A, DL1552A and R196, thermal insulation formulation (Tables 1 and 2) without requiring significant modification of the present techniques employed for the formulation thereof. It is a further highly desirable feature of the present invention that the insulation formulation may be composed of readily available commercial materials, provided that such compositions are properly assembled and blended together for the final insulation material.

Suitable EPDM terpolymers having an ENB diene component for use in this invention include, without limitation, and as stated above, KELTAN 4506, KELTAN 1446A, KELTAN 2308, each of which is available from DSM of the Netherlands, and NORDEL IP 4520 and NORDEL IP 4640, both of which are and continue to be available from DuPont Dow Elastomers.

These materials have the following respective contents as derived from the manufacturer's data literature:

|  | ENB Content Wt % | Ethylene Content Wt % | Mooney Viscosity |
| --- | --- | --- | --- |
| Keltan 4506 | 4.5 | 54 | 40 |
| Keltan 1446A | 7 | 59 | 10 |
| Keltan 2308 | 2 | 74 | 24 |
| Nordel IP 4520 | 5 | 51 | 20 |
| Nordel IP 4640 | 5 | 55 | 40 |

The remaining content is propylene with traces of certain dienes used to produce branching in the molecular structure.

In accordance with another preferred embodiment, the secondary EPDM terpolymer is/are NORDEL IP NDR-3722 and/or Buna EP T 2370, which include ENB as their diene monomers and are respectively available from DuPont Dow and Bayer Corporation and manufactured in relatively large capacities.

An exemplary formulation is set forth in TABLE 5:

TABLE 5

| Ingredient | Parts by Weight |
|---|---|
| Primary EPDM terpolymer | 70–80 |
| Secondary EPDM terpolymer with ENB diene monomer | 15–25 |
| Tackifier | 5–10 |
| Antioxidant | 1–3 |
| Wetting agent | 0–1 |
| Curing activator | 5–10 |
| Silica filler | 40–50 |
| Pigment | 0–3 |
| Plasticizer | 15–25 |
| Curing agent | 10–20 |

The primary EPDM preferably has a sufficiently high diene content to provide a more reactive polymer to decrease cure time. Preferably, the alkylidene diene content of the primary EPDM is in a range of about 2–12 wt %, more preferably about 10–12 wt %. Additionally, the primary EPDM terpolymer preferably has a medium ethylene content of from about 56 wt % to about 65 wt %.

In a more preferred embodiment, the primary and secondary terpolymer components, tackifier, antioxidant, wetting agent, curing activator, filler, pigment, plasticizer, and silica are the same as those set forth in Table 3 above and are present in the concentrations specified in Table 3. However, when following that formulation composition on simply a "drop in" basis, it was observed that an unsatisfactory scorch characteristic developed (e.g. a scorch time of about 5.9 minutes as against and 8 minute minimum time allowed per specification. Similarly, substituting Buna EP T 2370 in place of Nordel 2722E led to similar results of an unsatisfactory scorch time of 6.6 minutes and a high Mooney viscosity of 119. Consequently, according to this invention, a less reactive brominated phenolic resin curing agent, for instance, having a lower reactivity than that used in the DL1552A formulation (i.e., SP 1056 containing about 6 wt % bromine) was required and was selected in order to compensate for the observed higher reactivity of ENB. This then led to acceptable scorch characteristics and the use of cure temperatures of about 320° F. provided similar cure rates as were used for DL 1552A. The resulting physical properties were also acceptable. Preferably, the resin curing agent of the reformulated insulation formulation is SP 1055 (manufactured by Schenectady International), which contains about 3% bromine by weight.

It will be observed that these materials may have significant variations in specific norbornene content, and also in the ethylene/propylene content ratio as well as in the Mooney viscosity, yet each has been found to be effective if selected for use in production of a rocket motor insulation.

Adhesion-promoting secondary polymers that may also be used in the formulation include elastomer modifiers, especially polar polymers. Among suitable such secondary polymers are chlorosulfonated polyethylene, such as Hypalon 20 from DuPont Dow, and polychloroprene. Polychloroprene polymers are available from DuPont Dow under the tradenames Neoprene FB, Neoprene TW, and Neoprene GRT.

An exemplary plasticizer for the inventive formulation is the EPDM-based Trilene 67A (Uniroyal).

Tackifiers may also optionally be used. An example of a suitable tackifier is Akrochem P-133.

One or more antioxidants are also preferably included within the inventive insulation formulation. Preferred antioxidants include polymerized 1,2-dihydro-2,2,4-trimethylquinoline (Agerite Resin D) and mixed octylated diphenylamines (Agerite Stalite S), each of which is available from R. T. Vanderbilt Co.

Various powder silica fillers are well known in other elastomeric combinations and may be used, including HiSil 233.

An exemplary carbon fiber is VMC carbon fiber.

Suitable cure activators may include metal oxides, such as zinc oxide and magnesium oxide (e.g., Elastomag 170, from Morton Chemical Co.).

The curing package preferably includes at least one phosphate cure accelerator, including by way of example, Rhenocure AP-5, Rhenocure AP-7, Rhenocure AP-3, Rhenocure ZADT/G, and Rhenocure S/G, which are available from Rhein Chemie and Accelerator VS, available from Akro Chem. Additional cure accelerators that may be used in combination with the phosphate cure accelerator include butyl zimate, Altax, Akroform Delta P.M., Sulfads. While the use of Accelerator VS was initially unacceptable because of the foul odor problem it generated, it has also been now found that such formulations can be prepared with no significant odor when about 1.0 phr magnesium oxide is added thereto.

Sulfur curing agents are preferred for the formulation. A suitable sulfur-curing agent is Akrosperse IS-70 from Akro Chem. Elemental sulfur can also be used.

Batches of insulation containing silica powder generally may be formulated in an internal mixer with the following two-pass mix procedure. In the first pass, the mixer speed may be set to approximately 40 rpm and the all of the components other than the curing agents and accelerators are added to the internal mixer. (The silica was added last in the first pass.) The mixing may be performed at a temperature of about 300° F. Suitable mixing times depend on the temperature and mixing speed, and are ascertainable to the skilled artisan without an undue amount of experimentation.

In the second pass, the mixer speed was set to about 40 rpm. In a sequential manner, half of the master batch was added to the mixer, then the curatives were added, then the remaining half of the master batch was added to the mixer. The second mixing step was performed at a temperature of approximately 180° F. to 190° F. The material was sheeted out onto the laboratory mill and allowed to cool to room temperature prior to evaluating its rheological and physical properties.

The shaping and curing of the inventive insulation may be performed in accordance with techniques known in the art.

Exemplary new formulations containing a silica powder filler are set forth in TABLE 6 below with concentrations shown by weight.

TABLE 6

EXAMPLES OF SILICA FILLED EPDM INSULATION FORMULATIONS

| Ingredient | RDL5338 | RDL5342 | RDL5343 | RDL5347 | RDL5363 | RDL5255 | RDL5335 | RDL5201 | RDL5220 | RDL5370 |
|---|---|---|---|---|---|---|---|---|---|---|
| Keltan 4506 | 70.0 | 73.0 | 73.0 | 55.0 | 55.0 | | | | | |
| Keltan 1446A | 20.0 | 17.0 | 17.0 | | | | | | | |
| Keltan 2308 | | | | 35.0 | 35.0 | | | | | |
| Nordel IP 4520 | | | | | | | | 80.0 | 80.0 | 80.0 |
| Nordel IP 4640 | | | | | | 80.0 | 80.0 | | | |
| Hypalon 20 | 10.0 | 10.0 | 10.0 | 10.0 | 10.0 | | | | | |
| Neoprene FB | | | | | | 20.0 | 20.0 | | | |
| Neoprene TW | | | | | | | | 20.0 | 20.0 | |
| Neoprene GRT | | | | | | | | | | 20.0 |
| Trilene 67A | | | | | | | | | | |
| Kraton L-2203 | | | | | | | | | | |
| Akrochem P-133 | 5.0 | 5.0 | 5.0 | 5.0 | 5.0 | | | 5.0 | 5.0 | 5.0 |
| Agerite Resin D | | | | | | 2.0 | 2.0 | 2.0 | 2.0 | 2.0 |
| Agerite Stalite S | 2.0 | 2.0 | 2.0 | 2.0 | 2.0 | | | | | |
| HiSil 233 | 35.5 | 35.5 | 35.5 | 35.5 | 35.5 | 35.5 | 35.5 | 37.0 | 37.0 | 37.0 |
| Elastomag 170 | | | | | | | | 0.5 | 0.5 | 0.50 |
| Zinc Oxide | 3.0 | 3.0 | 3.0 | 3.0 | 3.0 | 4.0 | 4.0 | 4.0 | 4.0 | 4.00 |
| Butyl Zimate | 0.50 | 0.50 | | | | | | | 0.50 | |
| Rhenocure AP-5 | 3.50 | 3.50 | | | | | | | 3.50 | |
| Rhenocure AP-7 | | | | | | | | | | |
| Rhenocure AP-3 | | | | | | 2.90 | | 3.85 | | 3.85 |
| Rhenocure ZADT/G | | | | | | 0.80 | | 1.00 | | 1.00 |
| Rhenocure S/G | | | | | | 0.60 | | 0.80 | | 0.80 |
| Altax | | | 1.10 | 1.10 | 1.20 | | 1.10 | | | |
| Akroform Delta P.M. | | | | | 0.45 | | 0.20 | | | |
| Sulfads | | | | | 0.50 | | | | | |
| Accelerator VS | | | 2.70 | 2.70 | | | | | | |
| Akrosperse IS-70 | 1.10 | 1.10 | 1.20 | 1.20 | 1.40 | | | | 1.00 | |
| Sulfur | | | | | | 0.35 | 0.45 | 0.40 | | 0.40 |

| Ingredient | RDL5380 | RDL5381 | RDL5194 | RDL5222 | RDL5273A | RDL5298 | RDL5277 | RDL5279 | RDL5319 | RDL5320A |
|---|---|---|---|---|---|---|---|---|---|---|
| Keltan 4506 | | | | | | | | | | |
| Keltan 1446A | | | | | | | | | | |
| Keltan 2308 | | | | | | | | | | |
| Nordel IP 4520 | 80.0 | 80.0 | 90.0 | 90.0 | 90.0 | 80.0 | | | 40.0 | 40.0 |
| Nordel IP 4640 | | | | | | | 90.0 | 90.0 | 50.0 | 50.0 |
| Hypalon 20 | | | 10.0 | 10.0 | 10.0 | 10.0 | | | 10.0 | 10.0 |
| Neoprene FB | | | | | | | | | | |
| Neoprene TW | | | | | | | | | | |
| Neoprene GRT | 20.0 | 20.0 | | | | | | | | |
| Trilene 67A | | | | | | 10.0 | | | | |
| Kraton L-2203 | | | | | | | 10.0 | 10.0 | | |
| Akrochem P-133 | 5.0 | 5.0 | 5.0 | 5.0 | 5.0 | 5.0 | 9.0 | 9.0 | 5.0 | 5.0 |
| Agerite Resin D | 2.0 | 2.0 | 2.0 | 2.0 | 2.0 | 2.0 | 2.0 | 2.0 | | |
| Agerite Stalite S | | | | | | | | | 2.0 | 2.0 |
| HiSil 233 | 37.0 | 37.0 | 35.5 | 35.5 | 35.5 | 36.5 | 38.0 | 38.0 | 35.5 | 35.5 |
| Elastomag 170 | 0.50 | 0.50 | | | | | | | | |
| Zinc Oxide | 4.00 | 4.00 | 3.00 | | 4.00 | 3.00 | 3.00 | 3.00 | 3.0 | 4.0 |
| Butyl Zimate | 0.50 | | | 0.40 | | 0.15 | | | 0.40 | |
| Rhenocure AP-5 | 3.40 | | | 3.15 | | 4.45 | | | 3.15 | |
| Rhenocure AP-7 | | | | | | | 3.00 | | | |
| Rhenocure AP-3 | | | 3.85 | | | | | | | |
| Rhenocure ZADT/G | | | 1.00 | | | | 0.90 | | | |
| Rhenocure S/G | | | 0.80 | | | | | | | |
| Altax | | 1.00 | | | 1.00 | | | 1.20 | | 1.00 |
| Akroform Delta P.M. | | | | | | | | 0.25 | | |
| Sulfads | | | | | | | | 0.82 | | |
| Accelerator VS | | 2.70 | | | 2.70 | | | | | 2.70 |
| Akrosperse IS-70 | | | | 0.95 | 1.10 | 1.34 | 1.25 | 1.40 | 1.00 | 1.00 |
| Sulfur | 0.50 | 0.50 | 0.40 | | | | | | | |

| Ingredient | RDL5350 | RDL5351A | RDL5367 | RDL5185 | RDL5186 | RDL5205 | RDL5276 |
|---|---|---|---|---|---|---|---|
| Keltan 4506 | | | | | | | |
| Keltan 1446A | | | | | | | |
| Keltan 2308 | | | | | | | |
| Nordel IP 4520 | 45.0 | 45.0 | 45.0 | | | | |
| Nordel IP 4640 | 45.0 | 45.0 | 45.0 | 80.0 | 80.0 | 80.0 | 80.0 |
| Hypalon 20 | 10.0 | 10.0 | 10.0 | 10.0 | 10.0 | 10.0 | 10.0 |
| Neoprene FB | | | | | | | |
| Neoprene TW | | | | | | | |
| Neoprene GRT | | | | | | | |
| Trilene 67A | | | | 10.0 | 10.0 | 10.0 | 10.0 |
| Kraton L-2203 | | | | | | | |

TABLE 6-continued

EXAMPLES OF SILICA FILLED EPDM INSULATION FORMULATIONS

| | | | | | | | |
|---|---|---|---|---|---|---|---|
| Akrochem P-133 | 5.0 | 5.0 | 5.0 | 5.0 | 5.0 | 5.0 | 5.0 |
| Agerite Resin D | | | | 2.0 | 2.0 | 2.0 | 2.0 |
| Agerite Stalite S | 2.0 | 2.0 | 2.0 | | | | |
| HiSil 233 | 35.5 | 35.5 | 35.5 | 35.5 | 35.5 | 35.5 | 35.5 |
| Elastomag 170 | | | | | | | |
| Zinc Oxide | 3.0 | 4.0 | 3.0 | 3.0 | 3.0 | 3.0 | 3.0 |
| Butyl Zimate | 0.40 | | | | | | 0.40 |
| Rhenocure AP-5 | 3.15 | | | | | | 3.50 |
| Rhenocure AP-7 | | | | | 3.00 | | |
| Rhenocure AP-3 | | | | 3.85 | | 3.85 | |
| Rhenocure ZADT/G | | | | 0.80 | 0.80 | 1.00 | |
| Rhenocure S/G | | | | 0.80 | | 0.80 | |
| Altax | | 1.00 | 1.10 | | | | |
| Akroform Delta P.M. | | | 0.35 | | | | |
| Sulfads | | | 0.50 | | | | |
| Accelerator VS | | 2.70 | | | | | |
| Akrosperse IS-70 | 1.00 | 1.00 | 1.00 | | | | 1.05 |
| Sulfur | | | | 0.40 | 0.80 | 0.40 | |

In addition, individual batches of insulation formulations containing silica filler were prepared with NORDEL IP NDR-3725 (Example 1, Table 8 below), BUNA EP T 2370 (Example 2), and NORDEL 2722E (Comparative Example) as the secondary EPDM terpolymers having high ethylene contents. However, in these formulations it has been observed that there is an increased reactivity of the ethylidene norbornene monomers as used in Examples 1 and 2 (compared to the 1,4-hexadiene monomer of the Comparative Example A), and accordingly, SP 1055 (3 wt % bromine) was used in Examples 1 and 2 and SP 1056 (6 wt % bromine) was used in the Comparative Example A (Table 8) in equal quantities for comparison purposes. In addition, another formulation, RDL 5654 was also prepared in much the same way, but substituting NORDEL IP NDR-3722p for NORDEL IP NDR-2722E, and SP 1055 was used in place of SP 1056.

TABLE 7

| Polymer | Ethylene content % | Propylene content % | Diene content % type | Viscosity |
|---|---|---|---|---|
| NORDEL IP NDR-3722 | 71 | 26.5 | 2.5/ENB | 25 |
| BUNA EP T 2370 | 71 | 26 | 3/ENB | 16 |
| NORDEL 2722E | 72 | 22 | 6.4/HD | 26 |

The batches were each formulated in a laboratory scale Reliable Rubber & Plastics Machinery Company Model R-260 internal mixer having a net chamber volume of 4260 cubic centimeters. A 3000 gram batch was prepared by a two-pass mix procedure.

In the first pass, the mixer speed was set at 40 rpm, and the primary and secondary polymer components, tackifier, and antidegradant were added to the mixing chamber in the concentrations set forth in Table 3 and masticated for one minute. Subsequently, the remaining ingredients were added (same concentrations as in Table 3), and the mixer speed was increased to 60 rpm. The batches were removed from the internal mixer after mixing for a total of approximately 7 minutes. The temperature at the time of removing the batch was 300° F. to 320° F. The master batch was sheeted out on a 6"×13" Farrel Corporation laboratory two-roll mill and allowed to cool to room temperature.

In the second pass, the mixer speed was set to 40 rpm. In a sequential manner, half of the master batch was added to the mixer, then the curatives were added (same concentrations as set forth in Table 3), then the remaining half of the master batch was added to the mixer. After a total mix time of approximately 40 seconds, the final mix was removed from the mixer. The actual temperature at the time of removal was approximately 200° F. The material was sheeted out onto the laboratory mill and allowed to cool to room temperature prior to evaluating its rheological and physical properties.

The rheological properties of these several formulations are reported in Table 8.

TABLE 8

RHEOLOGICAL PROPERTIES (silica filler)

| Property | Example 1 [RDL5294] | Example 2 [RDL5331] | RDL5654 | Comparative Example A |
|---|---|---|---|---|
| (1) Mooney viscosity (ML 1 + 4 at 212° F.)(ASTM D 1646) | 63.4 | 61.0 | 65.4 | 68.8 |
| (2) Mooney scorch (MS + 1 at 250° F., min.)(ASTM D 1646) | 21.5 | 18.1 | 27.1 | 11.8 |
| (3) Oscillating disk rheometer (ODR at 320° F., 5° arc)(ASTM D 2084) properties: | | | — | |
| (a)   ML (minimum torque, in.-lb.) (ASTM D 2084) | 17.8 | 16.4 | 17.1 | 21.4 |

TABLE 8-continued

RHEOLOGICAL PROPERTIES (silica filler)

| Property | | Example 1 [RDL5294] | Example 2 [RDL5331] | RDL5654 | Comparative Example A |
|---|---|---|---|---|---|
| (b) | MH (maximum torque, at 2 hrs, in.-lb.)(ASTM D 2084) | 91.0 | 95.0 | 86.8 | 97.7 |
| (c) | Ts2, (time to 2 point rise above minimum viscosity, in min.) (ASTM D 2084) | 2.3 | 1.8 | 2.4 | 1.5 |
| (d) | MC(90)(in.-lb.)(ASTM D 2084) | 83.7 | 87.1 | 79.8 | 90.1 |
| (e) | Tc (90)(min)(ASTM E 2084) | 74.0 | 73.5 | 77.1 | 75.5 |

The physical characteristics of these formulations are reported as follows in Table 9.

TABLE 9

PHYSICAL PROPERTIES

| Properties | Specification Requirement | Example 1 [RDL5294] | Example 2 [RDL5331] | RDL 5654 | Comparative Example A |
|---|---|---|---|---|---|
| Shore A hardness (ASTM D 2240) | 69–79 | 73.8 | 74.2 | 72.4 | 71.8 |
| Ash content (%) (ASTM D 297) | 20–26 | 22.6 | 22.4 | 22.2 | 22.7 |
| Specific gravity (ASTM D 792) | 1.04–1.07 | 1.051 | 1.058 | 1.056 | 1.054 |
| Tensile strength, perpendicular (psi; ASTM D 412) | 1450 min. | 2420 | 2480 | 2210 | 2280 |
| Elongation parallel (%; ASTM D 412) | 450 min | 703 | 693 | 643 | 636 |
| 100% modulus (psi) | — | 347 | 370 | 377 | 371 |
| Tear resistance (pli) (ASTM D 624) | 170 min. | 233 | 238 | 230 | 221 |
| Specific heat (BTU (lb.)$^{-1}$(° F.)$^{-1}$ (ASTM E 1269) | — | 0.445 | 0.442 | — | 0.443 |
| Thermal conductivity (BTU (ft)$^{-1}$(in.)$^{-1}$(° F.)$^{-1}$ (ASTM E 1225) | — | 0.134 | 0.133 | — | 0.129 |

Measurements were also made of the resulting ablation rates for these formulations.

TABLE 10

MATERIAL ABLATION RATE (MILS/SECOND)

| | Example 1 | Example 2 | Comparative Example A |
|---|---|---|---|
| Low Mach Region (0.0028) | 3.00 | 3.13 | 3.40 |
| Medium Mach Region (0.0318–0.0386) | 7.34 | 7.94 | 7.60 |
| High Mach Region (0.0397–0.0634) | 19.60 | 17.37 | 20.11 |

The ablation tests for Table 10 were performed as follows. The tests were performed in a char motor, schematically illustrated in FIG. 2. The samples for the three velocity regions of the motor (low, medium, and high Mach) were net molded using conventional compression molding techniques. The low Mach region had space for 15 specimens, while the medium and high Mach regions had space for 4 specimens. The thickness of each specimen was measured at several axial locations before and after firing. The char motor itself featured a propellant beaker filled with Thiokol Propulsion propellant TP-H1148 to a sufficient depth to provide for a 12-second burn with a tungsten nozzle radius of 0.24 inches. The actual action time and average operating pressure for the test motor were 11.7 seconds and 936 psi, respectively.

The cure characteristics and processability of the inventive Examples closely matched those of the Comparative Example A. The cure rates, as indicated by the 90 percent cure time tc(90), of Examples 1 and 2 were equivalent to that of the Comparative Example A. Similarly, the physical properties and ablative performance of the materials prepared in accordance with Examples 1 and 2 were substantially equivalent to those of the Comparative Example and were well within the specification requirements. Thus these results indicate that the new formulations have the capability of being substituted for the old standard to-be-discontinued insulations.

In addition, a comparison was made between DL1552A and RDL 5654 in a low mach test char motor using TP-H1148 propellant and a 30.8 second firing time at an average pressure of 881 psi. The following results indicate that RDL 5654 is a viable replacement for DLI 552A.

TABLE 10A

COMPARISON OF THE MATERIAL AFFECTED RATE (MAR)
OF DL1552A AND RDL5654 IN THE LOW MACH CHAR MOTOR

|  | Mach No. Range | D-5 DL1552A HPCAT-07 Average MAR (mils/sec.) | RDL5654 MIR-05 Average MAR (mils/sec.) |
|---|---|---|---|
| Test motor |  |  |  |
| Low velocity test section | 0.0027 | 3.83 | 3.86 |
| Medium velocity test section | 0.0027–0.0081 | 3.79 | 3.80 |
| High velocity test section | 0.0094–0.044 | 5.36 | 5.49 |

In the following TABLE 11 there are set forth examples of the new EPDM insulation formulations but now containing carbon fibers.

Batches of carbon fiber containing insulations generally may be formulated in a mixer via a two-pass mix procedure. In the first pass, the mixer speed may be set to approximately 40 rpm and the all of the components other than the curing agents, accelerators, and carbon fiber are added to the internal mixer. As the mixing proceeds, the temperature will increase up to about 300° F., or even higher. Suitable mixing times depend on the temperature and mixing speed, and are ascertainable to the skilled artisan without an undue amount of experimentation.

In the second pass, the mixer speed may be set to about 40 rpm., but this speed is dependent on the size of the mixer. In a sequential manner, half of the master batch was added to the mixer, then the curatives were added, then the remaining half of the master batch was added to the mixer. The second mixing step may be performed at a temperature rising to approximately 180° F. to 190° F. but below the temperature where the accelerator would become unduly activated. The material was sheeted out onto the laboratory mill and allowed to cool to room temperature. Then the material is dissolved in a suitable solvent, such as, by way of example, hydrocarbons such as hexane, heptane, and/or cyclohexane. The carbon fiber was then mixed with, for example, a sigma-blade mixer. The material is then sheeted out and the solvent allowed to evaporate at ambient atmosphere or in an oven. Throughout this process care must be taken that the frangible carbon fibers are not themselves fractured and broken up so as to become shortened and less effective as a result.

The shaping and curing of the inventive insulation may be performed in accordance with techniques known in the art.

The following Table 11 presents a number of examples of the novel EPDM formulations with carbon fibers.

TABLE 11

EXAMPLES OF NEW EPDM FORMULATIONS WITR CARBON FIBER

| INGREDIENT | RDL5421 | RDL5420A | RDL5377A | RDL5444A | RDL5443 | RDL5436 | RDL5408 | RDL5409 |
|---|---|---|---|---|---|---|---|---|
| Keltan 4506 |  |  |  |  |  |  |  |  |
| Keltan 1446A |  |  |  |  |  |  |  |  |
| Keltan 2308 |  |  |  |  |  |  |  |  |
| Nordel IP 4520 | 40.0 | 40.0 | 45.0 | 45.0 | 45.0 |  | 80.0 | 80.0 |
| Nordel IP 4640 | 50.0 | 50.0 | 45.0 | 45.0 | 45.0 | 80.0 |  |  |
| Hypalon 20 | 10.0 | 10.0 | 10.0 | 10.0 | 10.0 | 10.0 |  |  |
| Neoprene FB |  |  |  |  |  |  |  |  |
| Neoprene TW |  |  |  |  |  |  |  |  |
| Neoprene GRT |  |  |  |  |  |  | 20.0 | 20.0 |
| Trilene 67A |  |  |  |  |  | 10.0 |  |  |
| Akrochem P-133 | 5.0 | 5.0 | 5.0 | 5.0 | 5.0 | 5.0 | 5.0 | 5.0 |
| Agerite Resin D |  |  |  |  |  | 2.0 | 2.0 | 2.0 |
| Agerite Stalite S | 2.0 | 2.0 | 2.0 | 2.0 | 2.0 |  |  |  |
| HiSil 233 | 3 | 3 | 3 | 3 | 3 | 3 | 3 | 3 |
| VMC Carbon Fiber | All formulations adjusted to have 26.75% VMC Carbon Fiber in finished product | | | | | | | |
| C. B. N330 | 1 | 1 | 1 | 1 | 1 | 1 | 1 | 1 |
| Elastomag 170 |  |  |  |  |  |  | 0.50 | 0.50 |
| Zinc Oxide | 4.0 | 5.0 | 5.0 | 5.0 | 4.0 | 4.0 | 4.00 | 4.00 |
| Butyl Zimate | 0.40 |  | 0.40 |  |  |  |  | 0.50 |
| Rhenocure AP-5 | 3.15 |  | 3.15 |  |  |  |  | 3.40 |
| Rhenocure AP-7 |  |  |  |  |  | 3.00 |  |  |
| Rhenocure AP-3 |  |  |  |  |  |  | 3.85 |  |
| Rhenocure ZADT/G |  |  |  |  |  | 0.80 | 1.00 |  |
| Rhenocure S/G |  |  |  |  |  |  | 0.80 |  |
| Altax |  | 1.00 |  | 1.00 | 1.10 |  |  |  |
| Akroform Delta P.M. |  |  |  |  | 0.35 |  |  |  |
| Sulfads |  |  |  |  | 0.50 |  |  |  |
| Accelerator VS |  | 2.70 |  | 2.70 |  |  |  |  |
| Akrosperse IS-70 | 1.00 | 1.00 | 1.00 | 1.00 | 1.00 |  |  |  |
| Sulfur |  |  |  |  |  | 0.80 | 0.40 | 0.50 |

| Ingredient | RDL5445 | RDL5410 | RDL5375 | RDL5395 | RDL5394 | RDL5435 | RDL5434 | RDL5376A |
|---|---|---|---|---|---|---|---|---|
| Keltan 4506 |  | 70.0 | 73.0 | 55.0 | 55.0 |  |  |  |
| Keltan 1446A |  | 20.0 | 17.0 |  |  |  |  |  |
| Keltan 2308 |  |  |  | 35.0 | 35.0 |  |  |  |
| Nordel IP 4520 | 80.0 |  |  |  |  |  |  | 80.0 |
| Nordel IP 4640 |  |  |  |  |  | 80.0 | 80.0 |  |
| Hypalon 20 | 10.0 | 10.0 | 10.0 | 10.0 | 10.0 |  |  |  |
| Neoprene FB |  |  |  |  |  | 20.0 | 20.0 |  |
| Neoprene TW |  |  |  |  |  |  |  | 20.0 |

TABLE 11-continued

EXAMPLES OF NEW EPDM FORMULATIONS WITR CARBON FIBER

| | | | | | | | | |
|---|---|---|---|---|---|---|---|---|
| Neoprene GRT | | | | | | | | |
| Trilene 67A | 10.0 | | | | | | | |
| Akrochem P-133 | 5.0 | 5.0 | 5.0 | 5.0 | 5.0 | | | 5.0 |
| Agerite Resin D | 2.0 | | | | | 2.0 | 2.0 | 2.0 |
| Agerite Stalite S | | 2.0 | 2.0 | 2.0 | 2.0 | | | |
| HiSil 233 | 3 | 3 | 3 | 3 | 3 | 3 | 3 | 3 |
| VMC Carbon Fiber | All formulations adjusted to have 26.75% VMC Carbon Fiber in finished product | | | | | | | |
| C. B. N330 | 1 | 1 | 1 | 1 | 1 | 1 | 1 | |
| Elastomag 170 | | | | | | | | 0.5 |
| Zinc Oxide | 4.0 | 4.0 | 4.0 | 4.0 | 4.0 | 4.0 | 4.0 | 5.0 |
| Butyl Zimate | 0.15 | 0.50 | | | | | | 0.50 |
| Rhenocure AP-5 | 4.45 | 3.50 | | | | | | 3.50 |
| Rhenocure AP-7 | | | | | | | | |
| Rhenocure AP-3 | | | | | 2.90 | | | |
| Rhenocure ZADT/G | | | | | 0.80 | | | |
| Rhenocure S/G | | | | | 0.60 | | | |
| Altax | | | 1.10 | 1.10 | 1.20 | | 1.10 | |
| Akroform Delta P.M. | | | | | 0.45 | | 0.20 | |
| Sulfads | | | | | 0.50 | | | |
| Accelerator VS | | | 2.70 | 2.70 | | | | |
| Akrosperse IS-70 | 1.34 | 1.10 | 1.20 | 1.20 | 1.40 | | | 1.00 |
| Sulfur | | | | | | 0.35 | 0.45 | |

Silica Powder Filled Insulation Properties

TABLE 12 reports rheological properties measured for the silica powder thermal insulation formulations that were set forth in TABLE 6.

TABLE 12

RHEOLOGICAL PROPERTIES (silica powder)

| Silica-Filled EPDM Formulation | Mooney viscosity (ML 1+4 at 212° F. (ASTM D 1646) | Oscillating disk rheometer (ODR at 320° F., 5° arc) (ASTM D 2084) | | | |
|---|---|---|---|---|---|
| | | ML (minimum torque, in.-lb.) | MH maximum torque, at 1 hrs, in.-lb.) | ts2, (time to 2 point rise above ML, in min.) | Tc (90) (min) |
| RDL 5338 | 72.0 | 17.7 | 93.9 | 6.0 | 43.5 |
| RDL 5342 | 78.5 | 21.3 | 97.8 | 7.0 | 45.0 |
| RDL 5343 | 78.8 | 19.9 | 98.0 | 4.3 | 44.5 |
| RDL 5347 | 84.0 | 21.7 | 94.5 | 3.4 | 38.0 |
| RDL 5363 | 83.0 | 22.9 | 87.2 | 3.3 | 44.2 |
| RDL 5255 | 85.7 | 19.4 | 103.2 | 3.6 | 28.5 |
| RDL 5335 | 87.7 | 23.4 | 93.4 | 2.7 | 38.5 |
| RDL 5201 | 73.0 | 16.4 | 89.0 | 6.2 | 31.5 |
| RDL 5220 | 71.2 | 16.0 | 110.0 | 5.9 | 40.0 |
| RDL 5370 | 80.0 | 20.3 | 104.6 | 5.6 | 32.0 |
| RDL 5380 | 80.3 | 21.0 | 107.4 | 7.3 | 56.0 |
| RDL 5381 | 79.6 | 21.0 | 104.0 | 4.8 | 36.0 |
| RDL 5194 | 62.0 | 13.4 | 90.9 | 8.7 | 44.0 |
| RDL 5222 | 61.9 | 13.5 | 92.8 | 6.3 | 45.6 |
| RDL 5273A | 64.5 | 14.7 | 97.1 | 3.8 | 42.0 |
| RDL 5298 | 51.0 | 11.0 | 91.0 | 7.1 | 49.0 |
| RDL 5277 | 72.4 | 18.9 | 98.5 | 1.9 | 42.6 |
| RDL 5279 | 75.0 | 17.3 | 93.0 | 2.7 | 18.8 |
| RDL 5319 | 87.8 | 19.9 | 97.0 | 6.3 | 43.0 |
| RDL 5320A | 86.5 | 20.7 | 103.0 | 4.0 | 41.6 |
| RDL 5350 | 83.0 | 22.0 | 103.0 | 6.8 | 46.1 |
| RDL 5351A | 84.6 | 19.8 | 105.6 | 3.5 | 37.0 |
| RDL 5367 | 86.0 | 22.3 | 96.7 | 3.2 | 43.3 |
| RDL 5185 | 79.5 | 18.7 | 90.0 | 8.4 | 40.9 |
| RDL 5186 | 80.6 | 19.3 | 95.5 | 4.1 | 43.0 |
| RDL 5205 | 79.9 | 19.4 | 94.0 | 8.0 | 41.2 |
| RDL 5276 | 81.6 | 18.5 | 96.7 | 6.2 | 42.5 |

TABLE 13 reports various physical properties measured for the silica powder thermal insulation formulations that were set forth in TABLE 6.

TABLE 13

PHYSICAL PROPERTIES

| Silica-Filled EPDM Formulation | A | B | C | D | E | F | G |
|---|---|---|---|---|---|---|---|
| RDL 5338 | 2280 | 646 | 2260 | 658 | 220 | 62.0 | 1.06 |
| RDL 5342 | 1910 | 588 | 1790 | 582 | 206 | 63.4 | 1.06 |
| RDL 5343 | 2330 | 655 | 2040 | 619 | 221 | 63.2 | 1.06 |
| RDL 5347 | 2100 | 621 | 2060 | 630 | 271 | 68.6 | 1.06 |
| RDL 5363 | 2920 | 610 | 2820 | 608 | 270 | 72.0 | 1.06 |
| RDL 5255 | 2430 | 703 | 2330 | 695 | 223 | 69.4 | 1.10 |
| RDL 5335 | 2560 | 725 | 2600 | 739 | 232 | 65.2 | 1.10 |
| RDL 5201 | 2150 | 772 | 2220 | 779 | 190 | 70.2 | 1.10 |
| RDL 5220 | 2170 | 634 | 2020 | 620 | 194 | 70.2 | 1.10 |
| RDL 5370 | 2550 | 700 | 2340 | 688 | 201 | 70.4 | 1.10 |
| RDL 5380 | 2610 | 688 | 2300 | 663 | 206 | 69.4 | 1.11 |
| RDL 5381 | 2420 | 700 | 2470 | 701 | 207 | 69.0 | 1.11 |
| RDL 5194 | 1920 | 734 | 1920 | 748 | 201 | 71.8 | 1.05 |
| RDL 5222 | 2100 | 703 | 1960 | 653 | 218 | 71.2 | 1.05 |
| RDL 5273A | 1420 | 612 | 1430 | 613 | 241 | 70.4 | 1.06 |
| RDL 5298 | 1910 | 592 | 1870 | 586 | 223 | 71.6 | 1.06 |
| RDL 5277 | 2010 | 614 | 2190 | 632 | 181 | 66.4 | 1.05 |
| RDL 5279 | 2390 | 672 | 2370 | 687 | 199 | 64.8 | 1.05 |
| RDL 5319 | 2440 | 659 | 2270 | 647 | 205 | 71.2 | 1.05 |
| RDL 5320A | 2250 | 657 | 2220 | 653 | 224 | 71.6 | 1.06 |
| RDL 5350 | 2350 | 688 | 2420 | 707 | 233 | 64.2 | 1.06 |
| RDL 5351A | 2270 | 681 | 2250 | 699 | 226 | 65.2 | 1.06 |
| RDL 5367 | 2440 | 621 | 2430 | 625 | 238 | 70.4 | 1.06 |
| RDL 5185 | 2310 | 776 | 2230 | 771 | 208 | 71.4 | 1.06 |
| RDL 5186 | 2390 | 725 | 2290 | 718 | 221 | 71.6 | 1.06 |
| RDL 5205 | 1990 | 729 | 2120 | 773 | 207 | 71.6 | 1.06 |
| RDL 5276 | 2270 | 653 | 2210 | 656 | 223 | 71.2 | 1.06 |

Key:
A = Tensile strength, parallel (psi)(ASTM D 412)
B = Elongation Parallel (%)(ASTM D 412)
C = Tensile Strength Perpendicular (ASTM D 412)
D = Elongation Perpendicular (ASTM D 412)
E = Tear Strength (ASTM D 412)
F = Shore A hardness (ASTM D 2240)
G = Specific gravity (ASTM D 792)

Carbon-Fiber Containing Insulation Formulation Properties

Next, Table 14 lists the rheological properties measured according to the indicated tests for the carbon fiber-containing insulation formulations set forth in TABLE 11.

TABLE 14

RHEOLOGICAL PROPERTIES

Oscillating Disk Rheometer
(ODR at 300° F., 5° arc)
(ASTM D 2084)

| Carbon-Fiber EPDM Formulation | Mooney viscosity (ML 1 + 4 at 212° F.) (ASTM D 1646) | ML (minimum torque, in.-lb.) | MH (maximum torque, at 1 hr, in.-lb.) | ts2, (time to a 2 point rise above ML; in min.) | Tc (90% cure) (min) |
|---|---|---|---|---|---|
| RDL 5421 | 72.4 | 23.3 | 111 | 3.5 | 30.2 |
| RDL 5420A | 70.0 | 21.2 | 119 | 2.9 | 37.0 |
| RDL 5377A | 68.0 | 18.8 | 102 | 2.8 | 36.5 |
| RDL 5444A | 67.4 | 21.0 | 110 | 3.2 | 28.0 |
| RDL 5443 | 74.5 | 25.7 | 101 | 1.6 | 33.5 |
| RDL 5436 | 80.0 | 25.8 | 98.2 | 2.6 | 32.0 |
| RDL 5408 | 83.0 | 29.2 | 95.5 | 2.5 | 16.5 |
| RDL 5409 | 83.8 | 25.8 | 99.0 | 3.5 | 25.5 |
| RDL 5445 | 56.0 | 15.8 | 82.0 | 3.4 | 39.2 |
| RDL 5410 | 81.0 | 18.6 | 103 | 4.8 | 34.5 |
| RDL 5375 | 55.0 | 21.0 | 100 | 2.5 | 31.7 |
| RDL 5395 | 64.7 | 29.2 | 87.4 | 3.2 | 35.0 |
| RDL 5394 | 67.0 | 25.1 | 89.5 | 1.8 | 36.0 |
| RDL 5410 | 81.0 | 18.0 | 103 | 4.8 | 34.5 |
| RDL 5434 | 43.7 | 12.1 | 136 | 1.9 | 18.8 |
| RDL 5435 | 39.0 | 9.1 | 118 | 2.3 | 19.0 |

Table 15 reports the physical properties measured for the carbon fiber-containing insulation formulations set forth in TABLE 11.

TABLE 15

PHYSICAL PROPERTIES

| Carbon-Fiber EPDM Form. | A | B | C | D | E | F |
|---|---|---|---|---|---|---|
| RDL 5421 | 1750 | 3.34 | 820 | 4.59 | 84.4 | 1.097 |
| RDL 5420A | 1600 | 3.12 | 871 | 4.60 | 84.2 | 1.106 |
| RDL 5377A | 1540 | 3.11 | 814 | 4.03 | 82.6 | 1.072 |
| RDL 5444A | 2030 | 5.01 | 884 | 6.30 | 84.2 | 1.097 |
| RDL 5443 | 2070 | 5.37 | 799 | 7.21 | 83.2 | 1.090 |
| RDL 5436 | 1500 | 2.48 | 721 | 4.05 | 84.0 | 1.098 |
| RDL 5408 | 1060 | 3.77 | 525 | 5.61 | 81.2 | 1.131 |
| RDL 5409 | 1112 | 2.95 | 668 | 3.35 | 83.4 | 1.142 |
| RDL 5445 | 1160 | 3.58 | 725 | 4.71 | 84.4 | 1.096 |
| RDL 5410 | 1500 | 2.88 | 719 | 3.85 | 83.8 | 1.063 |
| RDL 5375 | 2010 | 4.38 | 881 | 6.85 | 80.6 | 1.076 |
| RDL 5395 | 2650 | 4.55 | 1090 | 4.98 | 86.1 | 1.078 |
| RDL 5394 | 2218 | 3.80 | 982 | 4.84 | 87.2 | 1.088 |
| RDL 5435 | 1690 | 4.17 | 905 | 6.03 | 83.4 | 1.127 |
| RDL 5434 | 1470 | 4.41 | 786 | 5.82 | 83.6 | 1.126 |
| RDL 5410 | 1500 | 2.88 | 719 | 3.85 | 83.8 | 1.063 |
| RDL 5435 | 1690 | 4.17 | 905 | 6.03 | 83.4 | 1.127 |
| RDL 5434 | 1470 | 4.41 | 786 | 5.82 | 83.6 | 1.126 |

Key:
A = Tensile strength, parallel (psi) (ASTM D 412)
B = Elongation Parallel (%) (ASTM D 412)
C = Tensile Strength Perpendicular (ASTM D 412)
D = Elongation Perpendicular (ASTM D 412)
E = Shore A hardness (ASTM D 2240)
F = Specific gravity (ASTM D 792)

The following TABLE 16 shows the results of ablation tests with the silica powder-containing formulations of Tables 6, 12 and 13.

TABLE 16

MATERIAL ABLATION RATE
(MILS/SECOND)

| Silica powder Filled | Low Velocity, 0.003 Mach |
|---|---|
| RDL 5338 | 3.65 |
| RDL 5343 | 3.14 |
| RDL 5347 | 2.31 |
| RDL 5363 | 2.82 |
| RDL 5255 | 2.76 |
| RDL 5335 | 2.42 |
| RDL 5220 | 3.66 |
| RDL 5370 | 3.44 |
| RDL 5380 | 3.24 |
| RDL 5298 | 3.36 |
| RDL 5319 | 3.23 |
| RDL 5320 | 2.81 |
| RDL 5350 | 3.38 |
| RDL 5351 | 3.35 |
| RDL 5367 | 3.31 |
| RDL 5186 | 2.34 |

The ablation tests were performed as follows. The tests were performed in a char motor, schematically illustrated in FIG. 2. The samples for the three velocity regions of the motor (low, medium, and high Mach) were neat molded using conventional compression molding techniques. The low Mach region had space for 15 specimens, while the medium and high Mach regions had space for 4 specimens. The thickness of each specimen was measured at several axial locations before and after firing. The char motor itself featured a propellant beaker filled with Thiokol Propulsion propellant TP-H1148 to a sufficient depth to provide for a 12-second burn with a tungsten nozzle radius of 0.24 inches. The actual action time and average operating pressure for the test motor were 12.1 seconds and 860 psi, respectively.

The following TABLE 17 shows the results of ablation tests with the carbon fiber-containing formulations of Tables 11, 14 and 15.

TABLE 17

MATERIAL ABLATION RATE
(MILS/SECOND)

| Carbon fiber EPDM | Low Velocity, 0.003 Mach | Medium Velocity, Avg. 0.03–0.09 Mach | High Velocity, Avg. 0.01–0.15 Mach |
|---|---|---|---|
| RDL 5421 | 3.38 | 11.4 | 18.7 |
| RDL 5420 | 2.87 | 12.2 | 19.2 |
| RDL 5377 | 3.86 | 11.5 | 17.6 |
| RDL 5444 | 3.29 | 10.7 | 18.4 |
| RDL 5443 | 3.22 | 12.5 | 19.9 |
| RDL 5436 | 2.63 | 11.0 | 15.3 |
| RDL 5408 | 3.91 | 11.2 | 16.5 |
| RDL 5409 | 4.12 | 10.6 | 15.5 |
| RDL 5410 | 3.55 | 10.9 | 19.9 |
| RDL 5375 | 2.97 | 12.3 | 16.0 |
| RDL 5395 | 3.00 | 11.7 | 20.8 |
| RDL 5394 | 3.05 | 11.7 | 20.2 |
| RDL 5435 | 3.90 | 11.4 | 15.1 |
| RDL 5434 | 3.90 | 11.3 | 15.3 |
| RDL 5376 | 4.27 | 12.9 | 14.7 |
| RDL 5445 | 3.45 | 11.3 | 18.3 |

The ablation tests were also performed, as follows. The tests were performed in a char motor, schematically illustrated in FIG. 2. The samples for the low velocity region of the motor was molded using conventional compression molding techniques. The low Mach region had space for 15 specimens. The thickness of each specimen was measured at several axial locations before and after firing. The char motor itself featured a propellant beaker filled with Thiokol Propulsion propellant TP-H1148 to a sufficient depth to provide for a 12-second burn with a tungsten nozzle radius of 0.24 inches. The actual action time and average operating pressure for the test motor were 12.1 seconds and 860 psi, respectively.

From the characteristics measured in these tables it can be seen that a special combination of properties is required for a suitable insulation. And it is important to the consideration of this invention that the formulations are effective as to both of the commonly used solid additives silica powder and carbon fibers.

With reference to the results set forth in the foregoing tables it is presently considered in Table 13 (silica filled EPDM) that the minimum acceptable values for tensile strength (parallel and perpendicular, values A and C) should be at least about 1600, and are preferably close to equal (within about plus or minus 10%). The elongation (parallel and perpendicular, Table 13) should be in the range of about 550–850. For tear strength, the value of about 170 is presently seen as a minimum characteristic. Similarly, an ODR-measured maximum torque MH (Table 12) for the silica powder filled insulations should be at least about 85 in-lb. and at most about 120 in-lb., preferably at most about 115 in-lb. is currently thought to be appropriate. The ODR torque ML has a useful lower limit of about 5 in-lb., preferably about 10. The scorch test Ts result (Tables 12 and 14) should be at least 1.5. For silica filled insulations, the tear strength (Table 13) should be at least about 170. For carbon fiber containing insulations, the elongation should exhibit a minimum of at least about 2%, preferably at least about 2.5%, especially for measurement B in Table 15. Also, for the carbon fiber insulations (Table 14) the Mooney viscosity ML should be below about 90 Mooney units.

Considering the combined properties of the individual insulations noted in the above Tables, the silica-filled insulation 5273A is not presently preferred nor are the carbon-fiber containing insulations 5408, 5409, 5434 and 5445.

In addition, formulations were also made with using aramid fibers as the filler material. An exemplary EPDM terpolymer for use with Kevlar fibers and comprising ENB as its diene component is NORDEL IP NDR-4640 (available from DuPont Dow Elastomers), may be substituted into the R196 for the NORDEL 1040 without requiring significant modifications to the R196 formulation. Generally, the one significant modification that is required with the use of aramid fibers involves a reduction in the amount of the curing agent, e.g., peroxide, again to offset the increased reactivity (relative to HD) of the alkylidene norbornenes. Furthermore, NORDEL IP NDR-4640 is not presently foreseen as being susceptible to obsolescence issues.

Thus, in accordance with a further embodiment of this invention utilizing aramid fibers, the inventive rocket motor insulation formulation comprises, as a polymeric base, an EPDM/polyisoprene blend in which the diene component of the EPDM is based on at least one alkylidene norbornene, such as ethylidene norbornene (ENB), in effect in place of and without the above-described primary EPDM. The alkylidene norbornene content of such an EPDM may be from about 2–10 wt %. The selected EPDM terpolymer should be substitutable into the R196 thermal insulation formulation (Table 4) without requiring significant modification of the formulation. In accordance with a preferred embodiment, the EPDM terpolymer is NORDEL IP NDR-4640, which includes ENB as its diene monomer, is available from DuPont Dow Elastomers, and is manufactured in a relatively large capacity.

An exemplary aramid fiber formulation is set forth in TABLE 18:

TABLE 18

| Ingredient | Parts by Weight |
| --- | --- |
| EPDM terpolymer with ENB diene monomer component | 79.5–80.5 |
| Polyisoprene | 19.5–20.5 |
| Antioxidant | 0.95–1.05 |
| Halogen-containing flame retardant | 39.5–40.5 |
| Metal oxide flame retardant | 19.5–20.5 |
| KEVLAR fiber (aramid staple fiber) | 19.5–20.5 |
| Curing agent | 1.45–1.55 |

In a more preferred embodiment, the polyisoprene, antioxidant, flame retardants, and aramid, e.g. KEVLAR, fibers are the same as those set forth in Table 4 above and are present in the concentrations specified in Table 4. The metal oxide may be present in fine powdery form so as to also serve as a filler. Varox DBPH-50 is also a suitable peroxy curing agent, although the substitution of ethylidene norbornene for 1,4-hexadiene requires a reduction in curing agent concentration to offset the increased reactivity of ethylidene norbornene. By providing the reformulated thermal insulation formulation with a peroxide concentration in a range of from about 1 to about 2.5 phr, more preferably about 1.5 phr, curing effect is achieved similar to the properties of R196.

In general, the said EPDM/polyisoprene combination may be used with about 60–90 wt % of the norbornene EPDM and about 40–10 wt % polyisoprene, again with suitable additives being present in functionally desired amounts.

Suitable additives that may be added as functionally required or as desired include one or more of the following, in various combinations: fillers, antidegradants, curing agents, plasticizers, processing aids, and pigments, bonding agents, fibers, and flame retardants. Two classes of curing systems that may be used are sulfur based curing agents in combination with organic accelerators, and peroxide curing agents.

The shaping and curing of the such aramid inventive insulations may be performed in accordance with techniques known in the art.

Example of Aramid Fiber Insulations

Individual batches of insulation formulations were prepared USING NORDEL IP NDR-4640 (Example, in Table 20) and NORDEL IP NDR-1040 (Comparative Example B).

TABLE 19

| Polymer | Ethylene content | Propylene content | Diene content/type | Viscosity |
| --- | --- | --- | --- | --- |
| NORDEL IP NDR-4640 | 55 | 40 | 5/ENB | 40 |
| NORDEL 1040 | 55 | 41 | 4/HD | 40 |

The batches were each formulated in a laboratory scale Reliable Rubber & Plastics Machinery Company Model R-260 internal mixer having a net chamber volume of 4260 cubic centimeters. A 3000 gram batch was prepared by a two-pass mix procedure.

In the first pass, the mixer speed was set at 40 rpm, and 80 parts by weight of the corresponding EPDM component set forth in Table 3, 20 parts by weight of NATSYN 2200 polyisoprene, and 1.0 parts by weight of Wingstay S were added to the mixing chamber and masticated for one minute. Subsequently, 40 parts by weight of Dechlorane Plus 515, 20 parts by weight of $Sb_2O_3$, and 20 parts by weight of ¼ inch KEVLAR aramid fibers were added, and the mixer speed was increased to 60 rpm. The batches were removed from the internal mixer after mixing for a total of approximately 7 minutes. The temperature at the time of removing the batch was 300° F. to 320° F. The master batch was sheeted out on a 6"×13" Farrel Corporation laboratory two-roll mill and allowed to cool to room temperature.

For the Example and Comparative Example B, the fibers were dispersed in a two-roll mill to reduce agglomerations of fibers. The dispersion was accomplished by tightening the nip (separation between the two rolls) to 0.030 inches on the laboratory two-roll mill and passing the rubber through the nip a minimum of six times. This dispersion step was performed after the first pass but before the second pass. The rubber was then allowed to cool before the second pass.

In the second pass, the mixer speed was set to 40 rpm. In a sequential manner, half of the master batch was added to the mixer, then the curatives were added at a peroxide level of 1.5 phr, then the remaining half of the master batch was added to the mixer. After a total mix time of approximately 40 seconds, the final mix was removed from the mixer. The actual temperature at the time of removal was approximately 200° F. The material was sheeted out onto the laboratory mill and allowed to cool to room temperature prior to evaluating its rheological and physical properties.

Table 20 gives the measured rheological properties of these examples.

TABLE 20

RHEOLOGICAL PROPERTIES

| Property | | Example | Comparative Example B |
|---|---|---|---|
| (1) | Mooney viscosity (ML 1 + 4 at 212° F.)(ASTM D 1646) | 58.2 | 51.3 |
| (2) | Mooney scorch (MS + 1 at 270° F., min.)(ASTM D 1646) | 52.0 | 27.8 |
| (3) | Oscillating disk rheometer (ODR at 320° F., 5° arc) (ASTM D 2084) properties: | | |
| (a) | ML (minimum torque, in.-lb.) (ASTM D 2084) | 11.3 | 13.3 |
| (b) | MH (maximum torque, at 2 hrs, in.-lb.)(ASTM D 2084) | 61.5 | 55.0 |
| (c) | Ts2, (time to 2 point rise above minimum viscosity, in min.) (ASTM 2084) | 4.3 | 3.3 |
| (d) | MC(90)(in.-lb.)(ASTM 2084) | 56.4 | 50.8 |
| (e) | Tc(90)(min)(ASTM E 2084) | 65.5 | 63.0 |

Table 21 reports the physical properties of these aramid fiber examples.

TABLE 21

PHYSICAL PROPERTIES

| Properties | Specification Requirement | Example | Comparative Example B |
|---|---|---|---|
| Density (lbs/in³)(ASTM D 792) | 0.040 min | 0.0422 | 0.0421 |
| Shore A hardness (ASTM D 2240) | 70–85 | 75.8 | 74.4 |
| Tensile strength, parallel (psi) | 700 min | 1085 | 1050 |

TABLE 21-continued

PHYSICAL PROPERTIES

| Properties | Specification Requirement | Example | Comparative Example B |
|---|---|---|---|
| (ASTM D 412) | | | |
| Elongation parallel (%) (ASTM D 412) | 10 min | 27.3 | 24.6 |
| Tensile strength, perpendicular (psi)(ASTM D 412) | — | 461 | 367 |
| Elongation, perpendicular (%) | — | 109 | 126 |

Table 22 reports the results from a test to measure the ablation rates for these aramid fiber examples.

TABLE 22

MATERIAL ABLATION RATE (MILS/SECOND)

| | Example | Comparative Example B |
|---|---|---|
| Low Mach Region (0.0028) | 3.58 | 3.43 |
| Medium Mach Region (0.039–0.0970) | 10.55 | 10.83 |
| High Mach Region (0.109–0.140) | 16.59 | 21.99 |

The ablation tests were performed as follows. The tests were performed in a char motor, schematically illustrated in FIG. 2. The samples for the three velocity regions of the motor (low, medium, and high Mach) were net molded using conventional compression molding techniques. The low Mach region had space for 15 specimens, while the medium and high Mach regions had space for 4 specimens. The thickness of each specimen was measured at several axial locations before and after firing. The char motor itself featured a propellant beaker filled with Thiokol Propulsion propellant TP-H1148 to a sufficient depth to provide for a 12-second burn with a tungsten nozzle radius of 0.24 inches. The actual action time and average operating pressure for the test motor were 12.0 seconds and 842 psi, respectively.

Although the Mooney scorch time of the Example was somewhat longer than that of the Comparative Example (R196), at the cure temperature of 320° F., the cure rates, as indicated by the 90 percent cure time tc(90), of the two materials were equivalent. Similarly, the physical properties of the materials prepared in accordance with the Example and Comparative Example B were substantially equivalent and well within the specification requirements. Additionally, the ablative performance of the material prepared in accordance with the inventive Example was equivalent or better than the ablative performance of the Comparative Example B (R196).

In the course of experimentation leading to this invention, a number of other candidate elastomeric formulations were tried in the hopes that the path to a new acceptable insulation would not be overly difficult. In fact, such other formulations proved to be unsuccessful and this is demonstrated by the following illustrative unsuccessful examples.

| RUBBER COMPONENT FORMULA RDL5191 Total Wt. = 3000 grams | | | | |
|---|---|---|---|---|
| CATEGORY | Component Id. | PARTS by weight | Wt % | Grams |

-continued

RUBBER COMPONENT FORMULA RDL5191
Total Wt. = 3000 grams

| Category | Component | Parts by weight | Wt % | Grams |
|---|---|---|---|---|
| Polymers | 1 Nordel IP NDR-4640 | 80.00 | 54.22 | 1626.57 |
| Plasticizers | 2 Neoprene FB | 20.00 | 13.55 | 406.64 |
| Antioxidants | 3 Agerite Resin D | 2.00 | 1.36 | 40.66 |
| Fillers | 4 HiSil 233 | 35.50 | 24.06 | 721.79 |
| Activator | 5 Zinc Oxide | 4.00 | 2.71 | 81.33 |
|  | 6 2nd Pass Additions |  |  |  |
| Accelerators | 7 Rhenocure S/G | 0.80 | 0.54 | 16.27 |
|  | 8 Rhenocure AP-3 | 3.85 | 2.61 | 78.28 |
|  | 9 Rhenocure ZADT/G | 1.00 | 0.68 | 20.33 |
| Curative | 10 Sulfur | 0.40 | 0.27 | 8.13 |
|  | Totals: | 147.55 | 100.00 | 3000.00 |

Mixing Instructions, first pass:

Add Nordel and zinc oxide
Add Hisil and antioxidant
Add Neoprene FB
Dump about 280 F.
2nd Pass Additions Mix MB with curitives in Brabender
Dump about 190 or below.

RUBBER COMPONENT FORMULA RDL 5571
Total Wt. = 3000 grams

| Category | Component | Parts by weight | Wt % | Grams |
|---|---|---|---|---|
| Antioxidants | 5 Agerite Stalite S | 2.00 | 1.36 | 40.66 |
| Fillers | 6 HiSil 233 | 35.50 | 24.06 | 721.79 |
| Activator | 7 Zinc Oxide | 4.00 | 2.71 | 81.33 |
| 2nd Pass Additions | 8 |  |  |  |
| Accelerators | 9 Methyl Tuads | 0.75 | 0.51 | 15.25 |
|  | 10 Altax | 1.50 | 1.02 | 30.50 |
|  | 11 Sulfads | 0.75 | 0.51 | 15.25 |
|  | 12 Butyl Zimate | 1.50 | 1.02 | 30.50 |
| Curative | 13 Sulfur | 0.50 | 0.34 | 10.17 |
|  | Totals: | 151.50 | 102.68 | 3080.31 |

Mixing Instructions, first pass:

Mix EPDMs and Hypalon together
Add antioxidants 5 & 6, Add silica, zinc oxide
Add Akrochem resin.
Dump about 250–300°
2nd Pass Additions Mix MB with curitives in Brabender
Dump about 190° or below.

RUBBER COMPONENT FORMULA RDL5570
Total Wt. = 3000 grams

| CATEGORY | Component | PARTS by weight | Wt % | Grams |
|---|---|---|---|---|
| Polymers | 1 Nordel IP NDR-4640 | 50.00 | 33.89 | 1016.60 |
|  | 2 Nordel IP NDR-4520 | 40.00 | 27.11 | 813.28 |
| Plasticizers | 3 Hypalon 20 | 10.00 | 6.78 | 203.32 |
|  | 4 Akrochem P-133 | 5.00 | 3.39 | 101.66 |
| Antioxidants | 5 Agerite Stalite S | 2.00 | 1.36 | 40.66 |
| Fillers | 6 HiSil 233 | 35.50 | 24.06 | 721.79 |
| Activator | 7 Zinc Oxide | 4.00 | 2.71 | 81.33 |
|  | 8 2nd Pass Additions |  |  |  |
| Accelerators | 9 Methyl Ethyl Tuads | 2.00 | 1.36 | 40.66 |
|  | 10 Monex or Unads | 1.00 | 0.68 | 20.33 |
|  | 11 Sulfads | 1.00 | 0.68 | 20.33 |
|  | 12 Butyl Zimate; | 1.50 | 1.02 | 30.50 |
| Curative | 13 Sulfur | 0.50 | 0.34 | 10.17 |
|  | Totals: | 152.50 | 103.35 | 3100.64 |

Mixing Instructions, first pass:

Mix EPDMs and Hypalon together
Add antioxidants 5 & 6, Add silica, zinc oxide
Add Akrochem resin.
Dump about 250–300
2nd pass Additions Mix MB with curitives in Brabender
Dump about 190 or below.

RUBBER COMPONENT FORMULA RDL 5572
Weight = 3000 grams

| Category | Component | PARTS by weight | Wt % | Grams |
|---|---|---|---|---|
| Polymers | 1 Nordel IP NDR-4640 | 50.00 | 33.89 | 1016.60 |
|  | 2 Nordel IP NDR-4520 | 40.00 | 27.11 | 813.28 |
| Plasticizers | 3 Hypalon 20 | 10.00 | 6.78 | 203.32 |
|  | 4 Akrochem P-133 | 5.00 | 3.39 | 101.66 |
| Antioxidants | 5 Agerite Stalite S | 2.00 | 1.36 | 40.66 |
| Fillers | 6 HiSil 233 | 35.50 | 24.06 | 721.79 |
| Activator | 7 Zinc Oxide | 4.00 | 2.71 | 81.33 |
|  | 8 2nd Pass Additions |  |  |  |
| Accelerators | 9 Methyl Tuads | 3.00 | 2.03 | 61.00 |
|  | 10 Methyl Zimate | 3.00 | 2.03 | 61.00 |
|  | 11 Sulfasan R | 2.00 | 1.36 | 40.66 |
|  | 12 Butyl Zimate | 3.00 | 2.03 | 61.00 |
| Curative | 13 Sulfur | 0.50 | 0.34 | 10.17 |
|  | Totals: | 158.00 | 107.08 | 3212.47 |

Mixing Instructions, first pass:

Mix EPDMs and Hypalon together
Add antioxidants 5 & 6, Add silica, zinc oxide
Add Akrochem resin.
Dump about 250–300°
2nd Pass Additions Mix MB with curitives in Brabender
Dump about 190° or below.

RUBBER COMPONENT FORMULA RDL 5571
Total Wt. = 3000 grams

| CATEGORY | Component | PARTS by weight | Wt % | Grams |
|---|---|---|---|---|
| Polymers | 1 Nordel IP NDR-4640 | 50.00 | 33.89 | 1016.60 |
|  | 2 Nordel IP NDR-4520 | 40.00 | 27.11 | 813.28 |
| Plasticizers | 3 Hypalon 20 | 10.00 | 6.78 | 203.32 |
|  | 4 Akrochem P-133 | 5.00 | 3.39 | 101.66 |

RUBBER COMPONENT FORMULA RDL 5172
Total Wt = 3000 grams

| Category | Component | PARTS by weight | Wt % | Grams |
|---|---|---|---|---|
| Polymers | 1 Nordel IP NDR-4640 | 80.00 | 54.22 | 1626.57 |
|  | 2 Trilene 67A | 10.00 | 6.78 | 203.32 |
| Plasticizers | 3 Hypalon 20 | 10.00 | 6.78 | 203.32 |
|  | 4 Akrochem P-133 | 5.00 | 3.39 | 101.66 |

-continued

RUBBER COMPONENT FORMULA RDL 5172
Total Wt = 3000 grams

| | | | | |
|---|---|---|---|---|
| Antioxidants | 5 Agerite Resin D | 2.00 | 1.36 | 40.66 |
| Fillers | 6 HiSil 233 | 35.50 | 24.06 | 721.79 |
| Activator | 7 Zinc Oxide | 3.00 | 2.03 | 61.00 |
| 2nd Pass Additions | 8 | | | |
| Accelerators | 9 Captax | 1.00 | 0.68 | 20.33 |
| | 10 Tellurac | 0.50 | 0.34 | 10.17 |
| | 11 Sulfads | 0.75 | 0.51 | 15.25 |
| Curative | 12 Sulfur | 1.00 | 0.68 | 20.33 |
| | Totals: | 148.75 | 100.81 | 3024.40 |

Mixing Instructions, first pass:

Mix Nordel and Hypalon together
Add antioxidants 4 & 6, Add silica, zinc oxide
Add Trilene and Akrochem resin.
Dump about 250–300°
2nd Pass Additions Mix MB with curatives in Brabender
Dump about 190° or below As indicated below, for various reasons, the above-described experimental test insulations proved to be unsuitable formulations for production of rocket motor insulations.

TABLE 23

Unsuccessful Experiment Results

Rheological Properties

| Formulation | ML | MH | ts2 | Tc(90) | Rejected because: |
|---|---|---|---|---|---|
| RDL5571 | 25.3 | 138.3 | 2.3 | 21.3 | MH too high to match existing standard insulation |
| RDL5572 | 22.6 | 173.9 | 2.5 | 25.7 | MH too high to match existing standard insulation |
| RDL5570 | 25.6 | 128.6 | 2.7 | 29.5 | MH too high to match existing standard insulation |
| RDL5191 | 26.8 | 133.6 | 3.5 | 25.4 | MH too high to match existing standard insulation |
| RDL5172 | 39.0 | 128.0 | 1.0 | 25.0 | Uses the old cure system as in TABLE 2, but product is much too scorchy to be useful; cures at too low temperature |

As these unsuccessful formulations indicate, and faced with the discontinuance of the availability of the hitherto thought to be essential component for the present standard insulation formulations, the development of a suitable and acceptable solid propellant rocket motor insulation that will provide the required performance criteria has not been an easy task.

The foregoing detailed description of the preferred embodiments of the invention has been provided for the purposes of illustration and description. It is not intended to be exhaustive or to limit the invention to the precise embodiments disclosed. Many modifications and variations within the scope of this invention will be apparent to practitioners skilled in this art. The illustrated embodiments were chosen and described in order to best explain the principles of the invention and its practical application, thereby enabling others skilled in the art to understand the invention for various embodiments and with various modifications as are suited to the particular use contemplated. It is therefore intended that the scope of the invention cover various modifications and equivalents included within the spirit and scope of the appended claims.

We claim:

1. A rocket assembly comprising a rocket motor component insulated by an elastomeric insulation cured from an EPDM (ethylene propylene diene terpolymer) composition, the EPDM composition comprising:

a primary EPDM terpolymer formed from ethylene, propylene, and about 2–12 wt % of a diene;

a secondary EPDM terpolymer, different than the primary EPDM terpolymer, the secondary EPDM terpolymer being formed from ethylene, propylene, and an alkylidene norbornene;

silica filler additive; and a curing agent, wherein the elastomeric insulation insulates the rocket motor component.

2. The rocket assembly of claim 1, wherein the alkylidene norbornene is ethylidene norbornene.

3. The rocket assembly of claim 2, wherein 70 to 80 parts by weight of the EPDM composition consists of the primary EPDM terpolymer, and wherein 15 to 25 parts by weight of the EPDM composition consists of the secondary EPDM terpolymer.

4. The rocket assembly of claim 2, wherein about 56 weight percent to about 65 weight percent of the primary EPDM terpolymer consists of the ethylene.

5. The rocket assembly of claim 2, wherein the secondary EPDM terpolymer has a higher ethylene content than the primary EDPM terpolymer.

6. The rocket assembly of claim 2, wherein about 10–12 weight percent of the primary EPDM terpolymer consists of the diene.

7. The rocket assembly of claim 2, wherein the composition further comprises at least one member selected from the group consisting of antioxidants, plasticizers, tackifiers, and wetting agents.

8. The rocket assembly of claim 2, wherein the curing agent comprises a brominated phenolic resin.

9. The rocket assembly of claim 5, wherein the alkylidene norbornene is ethylidene norbornene, wherein 70 to 80 parts by weight of the EPDM composition consists of the primary EPDM terpolymer, wherein 15 to 25 parts by weight of the EPDM composition consists of the secondary EPDM terpolymer, and wherein the curing agent comprises a brominated phenolic resin.

10. The rocket assembly of claim 2, wherein the rocket motor component comprises a rocket motor case housing a solid propellant grain, and wherein the elastomeric insulation is positioned between the rocket motor case and the solid propellant grain.

11. A method for insulating a rocket motor component, comprising:

providing a rocket motor component;

preparing silica-filled elastomeric insulation by curing a primary EPDM (ethylene propylene diene terpolymer) terpolymer and a second EPDM terpolymer with a curing agent, the primary EPDM terpolymer being formed from ethylene, propylene, and about 2–12 wt % of a diene, the secondary EPDM terpolymer being different than the primary EPDM terpolymer and formed from ethylene, propylene, and ethylidene norbornene; and insulating the rocket motor component with the elastomeric insulation.

12. The method of claim 11, wherein said preparing comprises selecting 70 to 80 parts by weight of the primary EPDM terpolymer per 15 to 25 parts by weight of the secondary EPDM terpolymer.

13. The method of claim 11, wherein about 56 weight percent to about 65 weight percent of the primary EPDM terpolymer consists of the ethylene.

14. The method of claim 11, wherein the secondary EPDM terpolymer has a higher ethylene content than the primary EDPM terpolymer.

15. The method of claim 11, wherein about 10–12 weight percent of the primary EPDM terpolymer consists of the diene.

16. The method of claim 11, wherein said preparing comprises combining at least one member selected from the group consisting of antioxidants, plasticizers, tackifiers, and wetting agents with the primary and secondary EPDM terpolymers.

17. The method of claim 11, wherein the curing agent comprises a brominated phenolic resin.

18. The method of claim 11, wherein the rocket motor component comprises a rocket motor case housing a solid propellant grain, and wherein the elastomeric insulation is positioned between the rocket motor case and the solid propellant grain.

\* \* \* \* \*

UNITED STATES PATENT AND TRADEMARK OFFICE
CERTIFICATE OF CORRECTION

PATENT NO.           : 6,566,420 B1                                    Page 1 of 3
APPLICATION NO. : 09/481709
DATED                   : May 20, 2003
INVENTOR(S)         : David G. Guillot and Albert R. Harvey It is certified that error appears in the above-identified patent and that said Letters Patent is hereby corrected as shown below:

In the drawings:

| | | |
|---|---|---|
| FIGURE 3, | | change "CORE 46" to --46-- and change "PROPELLANT GRAIN 44" to --44-- |
| COLUMN 2, | LINE 21, | in Table 2, last column, below "5" and above "2" insert --1-- |
| COLUMN 2, | LINE 65, | in Table 3, last column, below "0.3" and above "20" insert --1-- |
| COLUMN 4, | LINE 22, | change "occur." to --occurred.-- |
| COLUMN 6, | LINE 42, | change "of its" to --off its-- |
| COLUMN 7, | LINE 8, | change "include" to --including-- |
| COLUMN 7, | LINE 65, | change "l$a$–3$b$," to --l$a$–3,-- |
| COLUMN 16, | LINE 67, | change "DLI 552A." to --DL1552A.-- |
| COLUMN 18, | LINE18, | change "solvent allowed" to --solvent is allowed-- |
| COLUMN 18, | LINE 31, | in Table 11, in the title of the table, change "WITR" to --WITH-- |
| COLUMN 20, | LINE 3, | the title of the table, change "WITR" to --WITH-- |
| COLUMN 24, | LINE 16, | change "aramid, e.g. KEVLAR," to --aramid fibers, e.g., KEVLAR®-- |
| COLUMN 24, | LINE 17, | change "fibers are" to --fibers, are-- |
| COLUMN 24, | LINE 29, | change "the said" to --the-- |

UNITED STATES PATENT AND TRADEMARK OFFICE
CERTIFICATE OF CORRECTION

PATENT NO. : 6,566,420 B1
APPLICATION NO. : 09/481709
DATED : May 20, 2003
INVENTOR(S) : David G. Guillot and Albert R. Harvey It is certified that error appears in the above-identified patent and that said Letters Patent is hereby corrected as shown below:

| | | |
|---|---|---|
| COLUMN 27, | LINE 23, | change "curitives" to --curatives-- |
| COLUMN 27, | LINE 43, | delete the semicolon after "Zimate" |
| COLUMN 27, | LINE 53, | change "curitives" to --curatives-- |
| COLUMN 28, | LINE 53, | change "curitives" to --curatives-- |

In the claims:

| | | | |
|---|---|---|---|
| CLAIM 5, | COLUMN 30, | LINE 34, | change "EDPM" to --EPDM-- |
| CLAIM 14, | COLUMN 31, | LINE 12, | change "EDPM" to --EPDM-- |

UNITED STATES PATENT AND TRADEMARK OFFICE
CERTIFICATE OF CORRECTION

PATENT NO. : 6,566,420 B1
APPLICATION NO. : 09/481709
DATED : May 20, 2003
INVENTOR(S) : David G. Guillot and Albert R. Harvey It is certified that error appears in the above-identified patent and that said Letters Patent is hereby corrected as shown below:

Please replace FIG. 3 with the following:

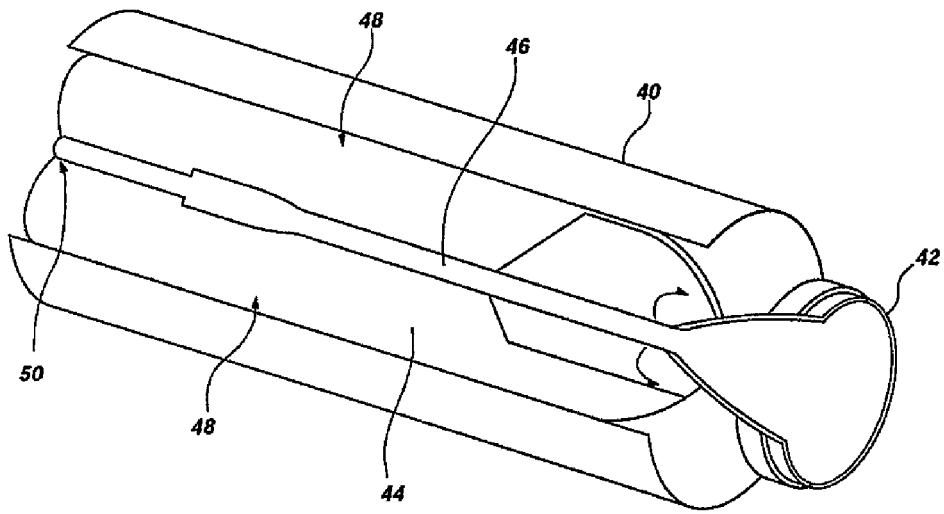

FIG. 3

Signed and Sealed this

Twenty-eighth Day of November, 2006

JON W. DUDAS
*Director of the United States Patent and Trademark Office*